US011706233B2

(12) United States Patent
Higgins et al.

(10) Patent No.: US 11,706,233 B2
(45) Date of Patent: *Jul. 18, 2023

(54) DETECTING INJECTION ATTACKS USING PASSIVE NETWORK MONITORING

(71) Applicant: ExtraHop Networks, Inc., Seattle, WA (US)

(72) Inventors: Benjamin Thomas Higgins, Shoreline, WA (US); Jesse Abraham Rothstein, Seattle, WA (US); Xue Jun Wu, Seattle, WA (US); Michael Kerber Krause Montague, Lake Forest Park, WA (US); Kevin Michael Seguin, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/214,555

(22) Filed: Mar. 26, 2021

(65) Prior Publication Data

US 2022/0021694 A1    Jan. 20, 2022

Related U.S. Application Data

(63) Continuation of application No. 16/424,387, filed on May 28, 2019, now Pat. No. 10,965,702.

(51) Int. Cl.
*H04L 9/32* (2006.01)
*H04L 9/40* (2022.01)
*H04L 43/0876* (2022.01)

(52) U.S. Cl.
CPC ...... *H04L 63/1425* (2013.01); *H04L 43/0876* (2013.01); *H04L 63/1433* (2013.01); *H04L 63/1466* (2013.01)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS

| 5,027,269 A | 6/1991 | Grant et al. |
| 5,430,727 A | 7/1995 | Callon |

(Continued)

FOREIGN PATENT DOCUMENTS

| AU | 2003287262 A1 | 5/2004 |
| AU | 2008328833 A1 | 6/2009 |

(Continued)

OTHER PUBLICATIONS

Office Communication for U.S. Appl. No. 16/679,055 dated Jul. 26, 2021, pp. 1-34.

(Continued)

*Primary Examiner* — Sharif E Ullah
(74) *Attorney, Agent, or Firm* — John W. Branch; Branch Partners PLLC

(57) ABSTRACT

Embodiments are directed to monitoring network traffic using network monitoring computers (NMCs). NMCs may determine requests provided to a server based on a first portion of network traffic. NMCs may determine suspicious requests based on characteristics of the provided requests. NMCs may employ the characteristics of the suspicious requests to provide correlation information that is associated with the suspicious requests. NMCs may determine dependent actions associated with the server based on a second portion of the network traffic and the correlation information. And, in response to determining anomalous activity associated with the evaluation of the dependent actions, NMCs may provide reports associated with the anomalous activity.

17 Claims, 11 Drawing Sheets

(56) References Cited

U.S. PATENT DOCUMENTS

| | | | |
|---|---|---|---|
| 5,541,995 A * | 7/1996 | Normile | H04L 9/40 380/42 |
| 5,548,646 A | 8/1996 | Aziz et al. | |
| 5,715,464 A | 2/1998 | Crump et al. | |
| 5,787,237 A | 7/1998 | Reilly | |
| 5,802,599 A | 9/1998 | Cabrera et al. | |
| 5,835,726 A | 11/1998 | Shwed et al. | |
| 5,857,188 A | 1/1999 | Douglas | |
| 5,928,363 A | 7/1999 | Ruvolo | |
| 6,058,429 A * | 5/2000 | Ames | H04L 49/602 370/399 |
| 6,141,686 A | 10/2000 | Jackowski et al. | |
| 6,263,049 B1 | 7/2001 | Kuhn | |
| 6,321,338 B1 | 11/2001 | Porras et al. | |
| 6,385,729 B1 | 5/2002 | DiGiorgio et al. | |
| 6,401,150 B1 | 6/2002 | Reilly | |
| 6,405,250 B1 | 6/2002 | Lin et al. | |
| 6,412,000 B1 | 6/2002 | Riddle et al. | |
| 6,526,044 B1 | 2/2003 | Cookmeyer, II et al. | |
| 6,560,636 B2 | 5/2003 | Cohen et al. | |
| 6,636,838 B1 * | 10/2003 | Perlman | H04L 63/0245 709/229 |
| 6,704,311 B1 | 3/2004 | Chuah et al. | |
| 6,704,874 B1 | 3/2004 | Porras et al. | |
| 6,765,909 B1 | 7/2004 | Sen et al. | |
| 6,807,156 B1 | 10/2004 | Veres et al. | |
| 6,807,565 B1 | 10/2004 | Dodrill et al. | |
| 6,883,015 B1 | 4/2005 | Geen et al. | |
| 6,901,517 B1 | 5/2005 | Redmore | |
| 6,944,599 B1 | 9/2005 | Vogel et al. | |
| 6,948,060 B1 | 9/2005 | Ramanathan | |
| 6,968,554 B1 | 11/2005 | Macdonald et al. | |
| 6,999,729 B2 | 2/2006 | Wandel | |
| 7,042,888 B2 | 5/2006 | Berggreen | |
| 7,047,303 B2 | 5/2006 | Lingafelt et al. | |
| 7,089,326 B2 | 8/2006 | Boucher et al. | |
| RE39,360 E | 10/2006 | Aziz et al. | |
| 7,133,365 B2 | 11/2006 | Klinker et al. | |
| 7,143,153 B1 | 11/2006 | Black et al. | |
| 7,177,930 B1 | 2/2007 | LoPresti | |
| 7,181,769 B1 | 2/2007 | Keanini et al. | |
| 7,193,968 B1 | 3/2007 | Kapoor et al. | |
| 7,222,366 B2 | 5/2007 | Bruton, III et al. | |
| 7,313,141 B2 | 12/2007 | Kan et al. | |
| 7,424,532 B1 | 9/2008 | Subbiah | |
| 7,454,499 B2 | 11/2008 | Cantrell et al. | |
| 7,457,870 B1 | 11/2008 | Lownsbrough et al. | |
| 7,474,654 B2 | 1/2009 | Guru | |
| 7,480,292 B2 * | 1/2009 | Busi | H04L 69/16 370/392 |
| 7,509,680 B1 | 3/2009 | Sallam | |
| 7,535,906 B2 | 5/2009 | Engbersen et al. | |
| 7,543,146 B1 | 6/2009 | Karandikar et al. | |
| 7,545,499 B2 | 6/2009 | Overbeck et al. | |
| 7,554,983 B1 | 6/2009 | Muppala | |
| 7,561,517 B2 | 7/2009 | Klinker et al. | |
| 7,580,356 B1 | 8/2009 | Mishra et al. | |
| 7,594,273 B2 | 9/2009 | Keanini et al. | |
| 7,602,731 B2 | 10/2009 | Jain | |
| 7,606,706 B1 | 10/2009 | Rubin et al. | |
| 7,609,630 B2 | 10/2009 | Gobeil | |
| 7,619,988 B2 | 11/2009 | Shimada et al. | |
| 7,620,986 B1 | 11/2009 | Jagannathan et al. | |
| 7,636,305 B1 | 12/2009 | Taylor et al. | |
| 7,639,613 B1 | 12/2009 | Ghannadian et al. | |
| 7,644,150 B1 | 1/2010 | Nucci et al. | |
| 7,660,883 B2 | 2/2010 | Fowlow | |
| 7,724,905 B2 | 5/2010 | Bleumer et al. | |
| 7,739,497 B1 | 6/2010 | Fink et al. | |
| 7,774,456 B1 | 8/2010 | Lownsbrough et al. | |
| 7,809,829 B2 | 10/2010 | Kelly et al. | |
| 7,810,151 B1 | 10/2010 | Guruswamy | |
| 7,817,549 B1 | 10/2010 | Kasralikar et al. | |
| 7,849,502 B1 | 12/2010 | Bloch et al. | |
| 7,864,764 B1 | 1/2011 | Ma et al. | |
| 7,916,652 B1 | 3/2011 | Lima et al. | |
| 7,936,682 B2 | 5/2011 | Singh et al. | |
| 7,937,755 B1 | 5/2011 | Guruswamy | |
| 7,944,822 B1 | 5/2011 | Nucci et al. | |
| 7,975,139 B2 | 7/2011 | Coulier | |
| 7,979,555 B2 | 7/2011 | Rothstein et al. | |
| 7,979,694 B2 | 7/2011 | Touitou et al. | |
| 8,040,798 B2 | 10/2011 | Chandra et al. | |
| 8,079,083 B1 | 12/2011 | Bennett et al. | |
| 8,102,783 B1 | 1/2012 | Narayanaswamy et al. | |
| 8,107,397 B1 | 1/2012 | Bagchi et al. | |
| 8,125,908 B2 * | 2/2012 | Rothstein | H04L 47/2483 370/252 |
| 8,185,953 B2 | 5/2012 | Rothstein et al. | |
| 8,194,542 B2 | 6/2012 | Väänänen et al. | |
| 8,352,725 B1 | 1/2013 | O'Toole, Jr. | |
| 8,402,540 B2 | 3/2013 | Kapoor et al. | |
| 8,411,677 B1 * | 4/2013 | Colloff | H04L 69/12 709/219 |
| 8,418,249 B1 | 4/2013 | Nucci et al. | |
| 8,443,190 B2 | 5/2013 | Breton et al. | |
| 8,457,127 B2 | 6/2013 | Eastham et al. | |
| 8,494,985 B1 | 7/2013 | Keralapura et al. | |
| 8,533,254 B1 | 9/2013 | Whitson, Jr. et al. | |
| 8,555,383 B1 | 10/2013 | Marshall et al. | |
| 8,561,177 B1 | 10/2013 | Aziz et al. | |
| 8,577,817 B1 | 11/2013 | Keralapura et al. | |
| 8,578,024 B1 | 11/2013 | Keralapura et al. | |
| 8,601,531 B1 | 12/2013 | Zolfonoon et al. | |
| 8,613,089 B1 | 12/2013 | Holloway et al. | |
| 8,619,579 B1 | 12/2013 | Rothstein et al. | |
| 8,627,422 B2 | 1/2014 | Hawkes et al. | |
| 8,635,441 B2 | 1/2014 | Frenkel et al. | |
| 8,667,151 B2 | 3/2014 | Mizikovsky et al. | |
| 8,699,357 B2 | 4/2014 | Deshpande et al. | |
| 8,707,440 B2 | 4/2014 | Gula et al. | |
| 8,744,894 B2 | 6/2014 | Christiansen et al. | |
| 8,782,393 B1 | 7/2014 | Rothstein et al. | |
| 8,817,655 B2 | 8/2014 | Szabo et al. | |
| 8,843,627 B1 | 9/2014 | Baldi et al. | |
| 8,848,744 B1 | 9/2014 | Rothstein et al. | |
| 8,861,397 B2 | 10/2014 | Kind et al. | |
| 8,959,643 B1 * | 2/2015 | Invernizzi | H04L 63/1425 713/188 |
| 8,964,548 B1 | 2/2015 | Keralapura et al. | |
| 8,971,196 B2 | 3/2015 | Degioanni et al. | |
| 9,026,467 B2 | 5/2015 | Bammi et al. | |
| 9,036,493 B2 | 5/2015 | Degioanni et al. | |
| 9,038,178 B1 | 5/2015 | Lin | |
| 9,049,216 B2 | 6/2015 | McCanne et al. | |
| 9,083,740 B1 | 7/2015 | Ma et al. | |
| 9,094,288 B1 * | 7/2015 | Nucci | H04L 43/026 |
| 9,094,326 B2 | 7/2015 | Sundararajan et al. | |
| 9,158,604 B1 | 10/2015 | Christodorescu et al. | |
| 9,176,838 B2 | 11/2015 | Li et al. | |
| 9,183,573 B2 | 11/2015 | Tseng | |
| 9,189,318 B2 | 11/2015 | Li et al. | |
| 9,191,400 B1 | 11/2015 | Ptasinski et al. | |
| 9,203,865 B2 | 12/2015 | Linden et al. | |
| 9,264,288 B1 | 2/2016 | Arora et al. | |
| 9,338,147 B1 | 5/2016 | Rothstein et al. | |
| 9,357,410 B2 | 5/2016 | Nedeltchev et al. | |
| 9,369,479 B2 | 6/2016 | Lin | |
| 9,380,489 B2 | 6/2016 | Kotecha et al. | |
| 9,391,866 B1 * | 7/2016 | Martin | H04L 41/0681 |
| 9,400,871 B1 | 7/2016 | Hewinson | |
| 9,401,925 B1 | 7/2016 | Guo et al. | |
| 9,426,036 B1 * | 8/2016 | Roy | G06N 20/00 |
| 9,430,646 B1 | 8/2016 | Mushtaq et al. | |
| 9,432,430 B1 | 8/2016 | Klenz | |
| 9,460,299 B2 | 10/2016 | Weiss et al. | |
| 9,461,875 B2 | 10/2016 | Groat et al. | |
| 9,479,405 B1 * | 10/2016 | Tongaonkar | H04L 43/04 |
| 9,483,742 B1 | 11/2016 | Ahmed | |
| 9,516,053 B1 | 12/2016 | Muddu et al. | |
| 9,531,736 B1 | 12/2016 | Torres et al. | |
| 9,565,202 B1 | 2/2017 | Kindlund et al. | |
| 9,565,203 B2 | 2/2017 | Bernstein et al. | |
| 9,591,015 B1 | 3/2017 | Amin et al. | |

(56) References Cited

U.S. PATENT DOCUMENTS

| | | | |
|---|---|---|---|
| 9,621,523 B2 | 4/2017 | Rothstein et al. | |
| 9,654,503 B1 | 5/2017 | Kowalyshyn | |
| 9,660,879 B1* | 5/2017 | Rothstein | H04L 43/026 |
| 9,692,658 B2* | 6/2017 | Guo | H04W 24/02 |
| 9,715,820 B1* | 7/2017 | Boss | H04L 67/1048 |
| 9,729,416 B1* | 8/2017 | Khanal | H04L 41/145 |
| 9,860,209 B2 | 1/2018 | Buchanan et al. | |
| 9,876,810 B2* | 1/2018 | McDougal | H04L 63/02 |
| 9,888,021 B2* | 2/2018 | Horesh | G06N 20/00 |
| 9,893,897 B2 | 2/2018 | Li et al. | |
| 9,967,292 B1 | 5/2018 | Higgins et al. | |
| 10,009,364 B2 | 6/2018 | Dasgupta et al. | |
| 10,009,793 B2 | 6/2018 | Wetterwald et al. | |
| 10,027,689 B1 | 7/2018 | Rathor et al. | |
| 10,028,167 B2 | 7/2018 | Calin et al. | |
| 10,033,766 B2 | 7/2018 | Gupta et al. | |
| 10,038,611 B1 | 7/2018 | Wu et al. | |
| 10,050,982 B1 | 8/2018 | Guerra et al. | |
| 10,063,434 B1 | 8/2018 | Khanal et al. | |
| 10,122,748 B1 | 11/2018 | Currie | |
| 10,176,323 B2 | 1/2019 | Zhang et al. | |
| 10,198,667 B2* | 2/2019 | Ryan, Jr. | H04W 12/02 |
| 10,204,211 B2 | 2/2019 | Hammerle et al. | |
| 10,237,294 B1 | 3/2019 | Zadeh et al. | |
| 10,263,883 B2 | 4/2019 | Kamble | |
| 10,264,003 B1 | 4/2019 | Wu et al. | |
| 10,270,794 B1 | 4/2019 | Mukerji et al. | |
| 10,277,618 B1 | 4/2019 | Wu et al. | |
| 10,305,928 B2 | 5/2019 | McGrew et al. | |
| 10,320,749 B2 | 6/2019 | Sengupta et al. | |
| 10,321,344 B2 | 6/2019 | Barton et al. | |
| 10,326,676 B1 | 6/2019 | Driggs et al. | |
| 10,332,005 B1 | 6/2019 | Liao et al. | |
| 10,348,767 B1* | 7/2019 | Lee | H04L 63/0236 |
| 10,375,155 B1* | 8/2019 | Cai | H04L 41/0896 |
| 10,380,498 B1* | 8/2019 | Chaoji | G06N 7/01 |
| 10,389,574 B1 | 8/2019 | Wu et al. | |
| 10,411,978 B1 | 9/2019 | Ball et al. | |
| 10,412,080 B1* | 9/2019 | Edwards | H04W 12/63 |
| 10,419,454 B2* | 9/2019 | El-Moussa | H04L 63/1416 |
| 10,476,673 B2 | 11/2019 | Higgins et al. | |
| 10,536,268 B2 | 1/2020 | Anderson et al. | |
| 10,536,475 B1 | 1/2020 | McCorkle, Jr. et al. | |
| 10,554,665 B1 | 2/2020 | Badawy et al. | |
| 10,581,915 B2 | 3/2020 | Scherman et al. | |
| 10,594,664 B2 | 3/2020 | Zaifman et al. | |
| 10,594,718 B1 | 3/2020 | Deaguero et al. | |
| 10,728,126 B2* | 7/2020 | Wu | H04L 41/22 |
| 10,742,677 B1* | 8/2020 | Wu | H04L 63/1425 |
| 10,778,700 B2 | 9/2020 | Azvine et al. | |
| 10,805,338 B2 | 10/2020 | Kohout et al. | |
| 10,841,194 B2* | 11/2020 | Kim | H04L 41/142 |
| 10,944,769 B2* | 3/2021 | Singh | H04L 63/0281 |
| 10,992,693 B2* | 4/2021 | Luo | H04L 63/1425 |
| 11,057,420 B2 | 7/2021 | McGrew et al. | |
| 11,159,549 B2 | 10/2021 | El-Moussa et al. | |
| 11,165,831 B2* | 11/2021 | Higgins | H04L 63/0218 |
| 11,194,901 B2 | 12/2021 | El-Moussa et al. | |
| 11,201,876 B2 | 12/2021 | Kallos et al. | |
| 11,310,256 B2 | 4/2022 | Higgins et al. | |
| 11,388,072 B2 | 7/2022 | Wu et al. | |
| 2001/0054157 A1 | 12/2001 | Fukumoto | |
| 2002/0023080 A1 | 2/2002 | Uga et al. | |
| 2002/0024964 A1 | 2/2002 | Baum et al. | |
| 2002/0035604 A1 | 3/2002 | Cohen et al. | |
| 2002/0055998 A1 | 5/2002 | Riddle et al. | |
| 2002/0065912 A1 | 5/2002 | Catchpole et al. | |
| 2002/0078382 A1 | 6/2002 | Sheikh et al. | |
| 2002/0080720 A1 | 6/2002 | Pegrum et al. | |
| 2002/0091844 A1* | 7/2002 | Craft | H04L 45/245 719/321 |
| 2002/0097724 A1 | 7/2002 | Halme et al. | |
| 2002/0107953 A1 | 8/2002 | Ontiveros et al. | |
| 2002/0133586 A1 | 9/2002 | Shanklin et al. | |
| 2002/0133622 A1 | 9/2002 | Pinto | |
| 2002/0152209 A1 | 10/2002 | Merugu et al. | |
| 2002/0156880 A1 | 10/2002 | Mokuya | |
| 2002/0175934 A1 | 11/2002 | Hand et al. | |
| 2002/0178360 A1* | 11/2002 | Wenocur | H04L 63/0823 713/170 |
| 2002/0184362 A1* | 12/2002 | Banerjee | H04L 63/1458 709/224 |
| 2002/0194483 A1* | 12/2002 | Wenocur | H04L 65/80 713/185 |
| 2002/0194501 A1* | 12/2002 | Wenocur | H04L 63/0428 726/4 |
| 2002/0199096 A1 | 12/2002 | Wenocur et al. | |
| 2002/0199098 A1 | 12/2002 | Davis | |
| 2003/0014628 A1 | 1/2003 | Freed et al. | |
| 2003/0018891 A1 | 1/2003 | Hall et al. | |
| 2003/0023733 A1* | 1/2003 | Lingafelt | H04L 67/1001 709/229 |
| 2003/0084279 A1 | 5/2003 | Campagna | |
| 2003/0093514 A1 | 5/2003 | Valdes et al. | |
| 2003/0131116 A1 | 7/2003 | Jain et al. | |
| 2003/0133443 A1 | 7/2003 | Klinker et al. | |
| 2003/0135667 A1 | 7/2003 | Mann et al. | |
| 2003/0145225 A1 | 7/2003 | Bruton, III et al. | |
| 2003/0149887 A1 | 8/2003 | Yadav | |
| 2003/0152094 A1 | 8/2003 | Colavito et al. | |
| 2003/0156715 A1 | 8/2003 | Reeds, III et al. | |
| 2003/0204621 A1 | 10/2003 | Poletto et al. | |
| 2003/0212900 A1 | 11/2003 | Liu et al. | |
| 2003/0214913 A1 | 11/2003 | Kan et al. | |
| 2003/0217144 A1 | 11/2003 | Fu et al. | |
| 2003/0233361 A1 | 12/2003 | Cady | |
| 2004/0003094 A1 | 1/2004 | See | |
| 2004/0047325 A1 | 3/2004 | Hameleers et al. | |
| 2004/0049699 A1 | 3/2004 | Griffith et al. | |
| 2004/0073512 A1 | 4/2004 | Maung | |
| 2004/0088544 A1 | 5/2004 | Tariq et al. | |
| 2004/0088557 A1 | 5/2004 | Malcolm et al. | |
| 2004/0093414 A1 | 5/2004 | Orton | |
| 2004/0093513 A1 | 5/2004 | Cantrell et al. | |
| 2004/0146006 A1 | 7/2004 | Jackson | |
| 2004/0162070 A1 | 8/2004 | Baral et al. | |
| 2004/0199630 A1 | 10/2004 | Sarkissian et al. | |
| 2004/0250059 A1 | 12/2004 | Ramelson et al. | |
| 2005/0015455 A1 | 1/2005 | Liu | |
| 2005/0015622 A1 | 1/2005 | Williams et al. | |
| 2005/0050316 A1 | 3/2005 | Peles | |
| 2005/0055578 A1 | 3/2005 | Wright et al. | |
| 2005/0060427 A1 | 3/2005 | Phillips et al. | |
| 2005/0066196 A1 | 3/2005 | Yagi | |
| 2005/0086255 A1 | 4/2005 | Schran et al. | |
| 2005/0091341 A1 | 4/2005 | Knight et al. | |
| 2005/0091357 A1 | 4/2005 | Krantz et al. | |
| 2005/0100000 A1* | 5/2005 | Faulkner | H04L 47/70 370/352 |
| 2005/0111367 A1* | 5/2005 | Jonathan Chao | H04L 63/1408 370/235 |
| 2005/0125553 A1 | 6/2005 | Wu et al. | |
| 2005/0125684 A1 | 6/2005 | Schmidt | |
| 2005/0182833 A1 | 8/2005 | Duffie, III et al. | |
| 2005/0193245 A1 | 9/2005 | Hayden et al. | |
| 2005/0201363 A1 | 9/2005 | Gilchrist et al. | |
| 2005/0210242 A1 | 9/2005 | Troxel et al. | |
| 2005/0234920 A1 | 10/2005 | Rhodes | |
| 2005/0251009 A1 | 11/2005 | Morita et al. | |
| 2005/0262237 A1 | 11/2005 | Fulton et al. | |
| 2005/0270975 A1* | 12/2005 | Meylan | H04W 72/52 370/229 |
| 2006/0029096 A1 | 2/2006 | Babbar et al. | |
| 2006/0045016 A1 | 3/2006 | Dawdy et al. | |
| 2006/0045017 A1 | 3/2006 | Yamasaki | |
| 2006/0075358 A1 | 4/2006 | Ahokas | |
| 2006/0085526 A1 | 4/2006 | Gulland | |
| 2006/0101068 A1 | 5/2006 | Stuhec et al. | |
| 2006/0106743 A1 | 5/2006 | Horvitz | |
| 2006/0123477 A1 | 6/2006 | Raghavan et al. | |
| 2006/0171333 A1 | 8/2006 | Shimada et al. | |
| 2006/0174343 A1 | 8/2006 | Duthie et al. | |
| 2006/0184535 A1 | 8/2006 | Kaluskar et al. | |

(56) References Cited

U.S. PATENT DOCUMENTS

| | | |
|---|---|---|
| 2006/0188494 A1 | 8/2006 | Bach et al. |
| 2006/0191008 A1 | 8/2006 | Fernando et al. |
| 2006/0191009 A1 | 8/2006 | Ito et al. |
| 2006/0200572 A1* | 9/2006 | Schcolnik ............ H04L 63/145 709/230 |
| 2006/0230452 A1 | 10/2006 | Field |
| 2006/0230456 A1 | 10/2006 | Nagabhushan et al. |
| 2006/0233349 A1 | 10/2006 | Cooper |
| 2007/0039051 A1 | 2/2007 | Duthie et al. |
| 2007/0043861 A1 | 2/2007 | Baron et al. |
| 2007/0067841 A1 | 3/2007 | Yegneswaran et al. |
| 2007/0077931 A1 | 4/2007 | Glinka |
| 2007/0088845 A1 | 4/2007 | Memon et al. |
| 2007/0110053 A1 | 5/2007 | Soni et al. |
| 2007/0143852 A1 | 6/2007 | Keanini et al. |
| 2007/0153689 A1 | 7/2007 | Strub et al. |
| 2007/0156886 A1 | 7/2007 | Srivastava |
| 2007/0156919 A1 | 7/2007 | Potti et al. |
| 2007/0157306 A1 | 7/2007 | Elrod et al. |
| 2007/0169190 A1 | 7/2007 | Kolton et al. |
| 2007/0188494 A1 | 8/2007 | Agutter et al. |
| 2007/0192863 A1 | 8/2007 | Kapoor et al. |
| 2007/0211625 A1* | 9/2007 | Liu ......................... H04L 47/10 370/431 |
| 2007/0239639 A1 | 10/2007 | Loughmiller et al. |
| 2007/0245420 A1 | 10/2007 | Yong et al. |
| 2007/0256122 A1 | 11/2007 | Foo et al. |
| 2008/0022401 A1* | 1/2008 | Cameron ............... G06F 21/562 726/22 |
| 2008/0031141 A1 | 2/2008 | Lean et al. |
| 2008/0034424 A1 | 2/2008 | Overcash et al. |
| 2008/0034425 A1 | 2/2008 | Overcash et al. |
| 2008/0059582 A1 | 3/2008 | Hartikainen et al. |
| 2008/0062995 A1 | 3/2008 | Kaas et al. |
| 2008/0069002 A1 | 3/2008 | Savoor et al. |
| 2008/0103610 A1 | 5/2008 | Ebrom et al. |
| 2008/0130645 A1 | 6/2008 | Deshpande et al. |
| 2008/0130659 A1 | 6/2008 | Polland |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0141275 A1 | 6/2008 | Borgendale et al. |
| 2008/0141374 A1 | 6/2008 | Sidiroglou et al. |
| 2008/0147818 A1 | 6/2008 | Sabo |
| 2008/0162390 A1 | 7/2008 | Kapoor et al. |
| 2008/0172416 A1* | 7/2008 | Ito ............................ G06F 21/10 |
| 2008/0212586 A1 | 9/2008 | Wang et al. |
| 2008/0219261 A1 | 9/2008 | Lin et al. |
| 2008/0222717 A1 | 9/2008 | Rothstein et al. |
| 2008/0225740 A1 | 9/2008 | Martin et al. |
| 2008/0232359 A1 | 9/2008 | Kim et al. |
| 2008/0279111 A1 | 11/2008 | Atkins et al. |
| 2008/0282080 A1 | 11/2008 | Hyndman et al. |
| 2008/0294384 A1 | 11/2008 | Fok et al. |
| 2008/0307219 A1 | 12/2008 | Karandikar |
| 2008/0320297 A1 | 12/2008 | Sabo et al. |
| 2009/0010259 A1 | 1/2009 | Sirotkin |
| 2009/0034426 A1 | 2/2009 | Luft et al. |
| 2009/0063665 A1 | 3/2009 | Bagepalli et al. |
| 2009/0089326 A1 | 4/2009 | Balasubramanian |
| 2009/0109973 A1 | 4/2009 | Ilnicki |
| 2009/0168657 A1 | 7/2009 | Puri et al. |
| 2009/0187653 A1 | 7/2009 | Fu et al. |
| 2009/0220080 A1 | 9/2009 | Herne et al. |
| 2009/0225675 A1 | 9/2009 | Baum et al. |
| 2009/0228330 A1 | 9/2009 | Karras et al. |
| 2009/0245083 A1 | 10/2009 | Hamzeh |
| 2009/0265344 A1 | 10/2009 | Etoh et al. |
| 2009/0268605 A1 | 10/2009 | Campbell et al. |
| 2009/0271469 A1 | 10/2009 | Benco et al. |
| 2009/0292954 A1 | 11/2009 | Jiang et al. |
| 2009/0296593 A1 | 12/2009 | Prescott |
| 2009/0316602 A1 | 12/2009 | Nandy et al. |
| 2009/0319773 A1 | 12/2009 | Frenkel et al. |
| 2009/0320138 A1 | 12/2009 | Keanini et al. |
| 2009/0327695 A1 | 12/2009 | Molsberry et al. |
| 2009/0328219 A1 | 12/2009 | Narayanaswamy |
| 2010/0027432 A1 | 2/2010 | Gopalan et al. |
| 2010/0091770 A1 | 4/2010 | Ishikawa |
| 2010/0095367 A1 | 4/2010 | Narayanaswamy |
| 2010/0131755 A1 | 5/2010 | Zhu et al. |
| 2010/0135498 A1* | 6/2010 | Long ....................... H04L 63/06 380/278 |
| 2010/0167713 A1 | 7/2010 | Hoffman |
| 2010/0191856 A1 | 7/2010 | Gupta et al. |
| 2010/0192225 A1 | 7/2010 | Ma et al. |
| 2010/0201573 A1 | 8/2010 | Lamming |
| 2010/0226301 A1 | 9/2010 | Lohmar et al. |
| 2010/0250918 A1 | 9/2010 | Tremblay et al. |
| 2010/0250928 A1 | 9/2010 | Goto |
| 2010/0268937 A1* | 10/2010 | Blom ...................... H04L 63/061 713/153 |
| 2010/0278056 A1 | 11/2010 | Meloche et al. |
| 2010/0281539 A1 | 11/2010 | Burns et al. |
| 2010/0299158 A1 | 11/2010 | Siegel |
| 2010/0316216 A1 | 12/2010 | Fukushima et al. |
| 2010/0322248 A1 | 12/2010 | Ivanov |
| 2010/0332618 A1 | 12/2010 | Norton et al. |
| 2011/0019574 A1 | 1/2011 | Malomsoky et al. |
| 2011/0055138 A1 | 3/2011 | Khanduja et al. |
| 2011/0122792 A1 | 5/2011 | Duffield et al. |
| 2011/0126259 A1 | 5/2011 | Krishnamurthi et al. |
| 2011/0126275 A1 | 5/2011 | Anderson et al. |
| 2011/0150220 A1 | 6/2011 | Breton et al. |
| 2011/0173441 A1 | 7/2011 | Bagepalli et al. |
| 2011/0173490 A1 | 7/2011 | Narayanaswamy et al. |
| 2011/0197276 A1 | 8/2011 | Dorrendorf et al. |
| 2011/0231652 A1 | 9/2011 | Bollay et al. |
| 2011/0280149 A1* | 11/2011 | Okada ................... H04L 67/125 370/252 |
| 2011/0296002 A1 | 12/2011 | Caram |
| 2011/0320394 A1 | 12/2011 | McKeown et al. |
| 2011/0321160 A1 | 12/2011 | Mohandas et al. |
| 2012/0016977 A1 | 1/2012 | Robertson et al. |
| 2012/0030731 A1 | 2/2012 | Bhargava et al. |
| 2012/0084838 A1 | 4/2012 | Inforzato et al. |
| 2012/0130745 A1 | 5/2012 | Jones |
| 2012/0131330 A1 | 5/2012 | Tönsing et al. |
| 2012/0166962 A1 | 6/2012 | Lunsford |
| 2012/0176917 A1 | 7/2012 | Matityahu et al. |
| 2012/0210385 A1 | 8/2012 | Cirstea et al. |
| 2012/0215328 A1 | 8/2012 | Schmelzer |
| 2012/0216282 A1 | 8/2012 | Pappu et al. |
| 2012/0233694 A1 | 9/2012 | Baliga et al. |
| 2012/0243533 A1 | 9/2012 | Leong |
| 2012/0266209 A1 | 10/2012 | Gooding et al. |
| 2012/0278477 A1 | 11/2012 | Terrell et al. |
| 2012/0278625 A1 | 11/2012 | Narayanan et al. |
| 2012/0278890 A1 | 11/2012 | Määttä et al. |
| 2012/0284791 A1 | 11/2012 | Miller et al. |
| 2012/0290711 A1 | 11/2012 | Upham et al. |
| 2012/0294305 A1 | 11/2012 | Rose et al. |
| 2012/0324585 A1 | 12/2012 | Beckett, III et al. |
| 2013/0007296 A1 | 1/2013 | Mukherjee et al. |
| 2013/0010600 A1 | 1/2013 | Jocha et al. |
| 2013/0010608 A1 | 1/2013 | Ramachandran et al. |
| 2013/0042323 A1 | 2/2013 | Narayanaswamy et al. |
| 2013/0061036 A1 | 3/2013 | Oliver |
| 2013/0064084 A1 | 3/2013 | Babbar et al. |
| 2013/0067034 A1 | 3/2013 | Degioanni et al. |
| 2013/0097203 A1 | 4/2013 | Bhattacharjee et al. |
| 2013/0103734 A1 | 4/2013 | Boldyrev et al. |
| 2013/0111543 A1 | 5/2013 | Brown et al. |
| 2013/0133032 A1 | 5/2013 | Li et al. |
| 2013/0166730 A1 | 6/2013 | Wilkinson |
| 2013/0176842 A1 | 7/2013 | Bauchot et al. |
| 2013/0188645 A1 | 7/2013 | Mack-Crane |
| 2013/0198512 A1* | 8/2013 | Rubin ................... H04L 63/0823 713/157 |
| 2013/0198827 A1 | 8/2013 | Bhaskaran et al. |
| 2013/0212297 A1 | 8/2013 | Varga |
| 2013/0227259 A1 | 8/2013 | Kim |
| 2013/0232104 A1 | 9/2013 | Goyal et al. |

(56) References Cited

U.S. PATENT DOCUMENTS

| | | | |
|---|---|---|---|
| 2013/0262655 A1* | 10/2013 | Deschenes | H04L 43/12 709/224 |
| 2013/0291107 A1 | 10/2013 | Marek et al. | |
| 2013/0305357 A1 | 11/2013 | Ayyagari et al. | |
| 2013/0305392 A1 | 11/2013 | Bar-El et al. | |
| 2013/0339514 A1* | 12/2013 | Crank | H04L 63/1408 709/224 |
| 2013/0347018 A1 | 12/2013 | Limp et al. | |
| 2014/0020067 A1 | 1/2014 | Kim et al. | |
| 2014/0026193 A1 | 1/2014 | Saxman et al. | |
| 2014/0040451 A1* | 2/2014 | Agrawal | H04L 67/56 709/224 |
| 2014/0068035 A1* | 3/2014 | Croy | H04L 41/0866 709/221 |
| 2014/0075536 A1* | 3/2014 | Davis | H04L 63/1416 726/13 |
| 2014/0077956 A1 | 3/2014 | Sampath et al. | |
| 2014/0109168 A1 | 4/2014 | Ashley et al. | |
| 2014/0149456 A1* | 5/2014 | Carr | G06F 16/951 707/770 |
| 2014/0164584 A1 | 6/2014 | Joe et al. | |
| 2014/0165207 A1 | 6/2014 | Engel et al. | |
| 2014/0189093 A1* | 7/2014 | du Toit | H04L 63/166 709/224 |
| 2014/0195797 A1* | 7/2014 | du Toit | H04L 63/168 713/152 |
| 2014/0201838 A1 | 7/2014 | Varsanyi et al. | |
| 2014/0222998 A1 | 8/2014 | Vasseur et al. | |
| 2014/0223325 A1 | 8/2014 | Melendez et al. | |
| 2014/0241164 A1 | 8/2014 | Cociglio et al. | |
| 2014/0242972 A1 | 8/2014 | Slotznick | |
| 2014/0258511 A1* | 9/2014 | Sima | H04L 63/0272 709/224 |
| 2014/0269777 A1* | 9/2014 | Rothstein | H04L 63/0428 370/503 |
| 2014/0304211 A1 | 10/2014 | Horvitz | |
| 2014/0304339 A1* | 10/2014 | Hamilton | H04L 67/1078 709/205 |
| 2014/0310392 A1* | 10/2014 | Ho | H04L 67/02 709/223 |
| 2014/0317288 A1* | 10/2014 | Krueger | H04L 41/5025 709/224 |
| 2014/0344633 A1* | 11/2014 | Li | G06F 11/0784 714/57 |
| 2014/0351415 A1* | 11/2014 | Harrigan | H04L 63/1408 709/224 |
| 2015/0006896 A1* | 1/2015 | Franck | H04L 9/3242 713/171 |
| 2015/0007314 A1 | 1/2015 | Vaughan | |
| 2015/0007316 A1* | 1/2015 | Ben-Shalom | H04L 63/12 726/23 |
| 2015/0023168 A1 | 1/2015 | Kotecha et al. | |
| 2015/0026027 A1 | 1/2015 | Priess et al. | |
| 2015/0058987 A1* | 2/2015 | Thure | G06F 21/565 726/23 |
| 2015/0063158 A1 | 3/2015 | Nedeltchev et al. | |
| 2015/0074258 A1* | 3/2015 | Ferreira | H04L 43/0876 709/224 |
| 2015/0074462 A1* | 3/2015 | Jacoby | G06F 11/079 714/37 |
| 2015/0089034 A1* | 3/2015 | Stickle | H04L 41/00 709/223 |
| 2015/0096022 A1 | 4/2015 | Vincent et al. | |
| 2015/0100780 A1 | 4/2015 | Rubin et al. | |
| 2015/0106616 A1* | 4/2015 | Nix | H04L 9/3249 713/170 |
| 2015/0106930 A1 | 4/2015 | Honda et al. | |
| 2015/0113588 A1* | 4/2015 | Wing | H04L 63/0227 726/1 |
| 2015/0121461 A1 | 4/2015 | Dulkin et al. | |
| 2015/0134554 A1 | 5/2015 | Clais et al. | |
| 2015/0134776 A1* | 5/2015 | Kruglick | H04L 67/568 709/217 |
| 2015/0149828 A1* | 5/2015 | Mukerji | G06F 11/079 714/37 |
| 2015/0180759 A1* | 6/2015 | Fallon | H04L 43/0876 709/224 |
| 2015/0180890 A1* | 6/2015 | Ronen | H04L 63/1416 726/23 |
| 2015/0188702 A1 | 7/2015 | Men et al. | |
| 2015/0199613 A1 | 7/2015 | Ruiz et al. | |
| 2015/0227859 A1 | 8/2015 | Ames, II | |
| 2015/0229661 A1 | 8/2015 | Balabine et al. | |
| 2015/0242627 A1* | 8/2015 | Lee | G06F 21/562 726/24 |
| 2015/0249512 A1 | 9/2015 | Adimatyam et al. | |
| 2015/0269358 A1* | 9/2015 | Hesketh | H04L 9/0866 713/164 |
| 2015/0277802 A1* | 10/2015 | Oikarinen | G06F 3/0689 711/114 |
| 2015/0304350 A1 | 10/2015 | Lin | |
| 2015/0331771 A1 | 11/2015 | Conway | |
| 2015/0341379 A1* | 11/2015 | Lefebvre | H04L 43/0894 726/22 |
| 2015/0350167 A1* | 12/2015 | Djakovic | H04L 63/0823 713/163 |
| 2015/0365438 A1 | 12/2015 | Carver et al. | |
| 2016/0006766 A1* | 1/2016 | Joo | G06F 21/53 726/1 |
| 2016/0026922 A1 | 1/2016 | Vasseur et al. | |
| 2016/0028755 A1 | 1/2016 | Vasseur et al. | |
| 2016/0036647 A1 | 2/2016 | Gonzalez et al. | |
| 2016/0043919 A1* | 2/2016 | Connelly | H04L 41/28 709/220 |
| 2016/0055335 A1 | 2/2016 | Herwono et al. | |
| 2016/0056959 A1 | 2/2016 | Blom et al. | |
| 2016/0080236 A1 | 3/2016 | Nikolaev et al. | |
| 2016/0093205 A1 | 3/2016 | Boyer | |
| 2016/0119215 A1 | 4/2016 | Deschênes et al. | |
| 2016/0127401 A1* | 5/2016 | Chauhan | H04L 63/0218 726/13 |
| 2016/0134659 A1* | 5/2016 | Reddy | H04L 61/2575 726/1 |
| 2016/0142435 A1 | 5/2016 | Bernstein et al. | |
| 2016/0173288 A1 | 6/2016 | Li et al. | |
| 2016/0173556 A1* | 6/2016 | Park | H04N 21/8547 709/219 |
| 2016/0182274 A1 | 6/2016 | Kiesekamp et al. | |
| 2016/0197949 A1* | 7/2016 | Nyhuis | H04L 63/1416 713/190 |
| 2016/0219066 A1 | 7/2016 | Vasseur et al. | |
| 2016/0226913 A1 | 8/2016 | Sood et al. | |
| 2016/0241574 A1 | 8/2016 | Kumar et al. | |
| 2016/0262044 A1 | 9/2016 | Calin et al. | |
| 2016/0285752 A1* | 9/2016 | Joshi | H04L 45/302 |
| 2016/0294870 A1* | 10/2016 | Banerjee | H04L 63/0245 |
| 2016/0301624 A1 | 10/2016 | Gonzalez et al. | |
| 2016/0301709 A1* | 10/2016 | Hassanzadeh | H04L 63/1425 |
| 2016/0308725 A1* | 10/2016 | Tang | H04L 41/12 |
| 2016/0337312 A1* | 11/2016 | Buchanan | H04L 63/0227 |
| 2016/0352761 A1 | 12/2016 | McGrew et al. | |
| 2016/0357964 A1 | 12/2016 | Mulchandani | |
| 2016/0357967 A1 | 12/2016 | Mulchandani | |
| 2016/0359872 A1 | 12/2016 | Yadav et al. | |
| 2016/0359915 A1 | 12/2016 | Gupta et al. | |
| 2016/0366020 A1 | 12/2016 | Ramachandran et al. | |
| 2016/0366186 A1 | 12/2016 | Kamble | |
| 2016/0373414 A1* | 12/2016 | MacCarthaigh | H04L 67/1004 |
| 2016/0380885 A1* | 12/2016 | Jani | H04L 45/306 370/408 |
| 2017/0012836 A1 | 1/2017 | Tongaonkar et al. | |
| 2017/0041296 A1 | 2/2017 | Ford et al. | |
| 2017/0048109 A1 | 2/2017 | Kant et al. | |
| 2017/0070416 A1 | 3/2017 | Narayanan et al. | |
| 2017/0076206 A1 | 3/2017 | Lastras-Montano et al. | |
| 2017/0085590 A1 | 3/2017 | Hsu et al. | |
| 2017/0090906 A1 | 3/2017 | Reynolds | |
| 2017/0093796 A1* | 3/2017 | Wang | H04L 63/0464 |
| 2017/0093891 A1* | 3/2017 | Mitchell | H04L 69/22 |
| 2017/0093897 A1* | 3/2017 | Cochin | H04L 63/145 |
| 2017/0097982 A1 | 4/2017 | Zhang et al. | |

(56) References Cited

U.S. PATENT DOCUMENTS

| | | | |
|---|---|---|---|
| 2017/0099196 A1* | 4/2017 | Barsheshet | H04L 47/2483 |
| 2017/0111272 A1* | 4/2017 | Liu | H04L 45/74 |
| 2017/0118092 A1 | 4/2017 | Dixon et al. | |
| 2017/0123886 A1 | 5/2017 | Vaideeswaran | |
| 2017/0126472 A1 | 5/2017 | Margalit et al. | |
| 2017/0126709 A1 | 5/2017 | Baradaran et al. | |
| 2017/0134937 A1* | 5/2017 | Miller | G06Q 20/3829 |
| 2017/0195353 A1* | 7/2017 | Taylor | H04L 69/22 |
| 2017/0230270 A1* | 8/2017 | Padinhakara | H04L 43/04 |
| 2017/0230417 A1 | 8/2017 | Amar et al. | |
| 2017/0270105 A1 | 9/2017 | Ninan et al. | |
| 2017/0279837 A1 | 9/2017 | Dasgupta et al. | |
| 2017/0279838 A1 | 9/2017 | Dasgupta et al. | |
| 2017/0279839 A1* | 9/2017 | Vasseur | H04L 63/1425 |
| 2017/0288974 A1 | 10/2017 | Yoshihira et al. | |
| 2017/0288987 A1 | 10/2017 | Pasupathy et al. | |
| 2017/0289104 A1* | 10/2017 | Shankar | H04L 63/166 |
| 2017/0289168 A1* | 10/2017 | Bar | H04L 63/102 |
| 2017/0289185 A1 | 10/2017 | Mandyam | |
| 2017/0289847 A1 | 10/2017 | Wetterwald et al. | |
| 2017/0310703 A1* | 10/2017 | Ackerman | H04L 63/1425 |
| 2017/0317941 A1 | 11/2017 | Eggleston et al. | |
| 2017/0324758 A1 | 11/2017 | Hart et al. | |
| 2017/0353437 A1* | 12/2017 | Ayyadevara | H04L 63/1458 |
| 2017/0353477 A1 | 12/2017 | Faigon et al. | |
| 2017/0364794 A1 | 12/2017 | Mahkonen et al. | |
| 2017/0366526 A1* | 12/2017 | Wood | H04W 12/041 |
| 2018/0007087 A1 | 1/2018 | Grady et al. | |
| 2018/0013650 A1 | 1/2018 | Khanal et al. | |
| 2018/0033089 A1 | 2/2018 | Goldman et al. | |
| 2018/0075240 A1 | 3/2018 | Chen | |
| 2018/0084011 A1 | 3/2018 | Joseph et al. | |
| 2018/0091413 A1 | 3/2018 | Richards et al. | |
| 2018/0091534 A1 | 3/2018 | Dubrovsky et al. | |
| 2018/0103056 A1* | 4/2018 | Kohout | H04L 63/1441 |
| 2018/0109507 A1 | 4/2018 | Caldera et al. | |
| 2018/0109557 A1 | 4/2018 | Yoo et al. | |
| 2018/0115566 A1 | 4/2018 | Azvine et al. | |
| 2018/0131675 A1 | 5/2018 | Sengupta et al. | |
| 2018/0131711 A1* | 5/2018 | Chen | H04L 43/026 |
| 2018/0137001 A1 | 5/2018 | Zong et al. | |
| 2018/0139227 A1 | 5/2018 | Martin et al. | |
| 2018/0167310 A1* | 6/2018 | Kamble | H04L 45/306 |
| 2018/0191755 A1 | 7/2018 | Monaco et al. | |
| 2018/0198812 A1 | 7/2018 | Christodorescu et al. | |
| 2018/0219879 A1 | 8/2018 | Pierce | |
| 2018/0260715 A1 | 9/2018 | Yan et al. | |
| 2018/0262487 A1 | 9/2018 | Zaifman et al. | |
| 2018/0276561 A1 | 9/2018 | Pasternack et al. | |
| 2018/0351781 A1 | 12/2018 | Movsisyan et al. | |
| 2018/0351970 A1 | 12/2018 | Majumder et al. | |
| 2018/0375882 A1 | 12/2018 | Kallos et al. | |
| 2018/0375893 A1 | 12/2018 | Jordan et al. | |
| 2019/0005205 A1 | 1/2019 | Dargar et al. | |
| 2019/0007283 A1* | 1/2019 | Kieviet | H04L 43/062 |
| 2019/0012441 A1 | 1/2019 | Tuli et al. | |
| 2019/0028357 A1* | 1/2019 | Kokkula | H04L 41/0823 |
| 2019/0052554 A1 | 2/2019 | Mukerji et al. | |
| 2019/0052675 A1 | 2/2019 | Krebs | |
| 2019/0068465 A1 | 2/2019 | Khanal et al. | |
| 2019/0079979 A1* | 3/2019 | Chan | G06Q 50/18 |
| 2019/0095478 A1 | 3/2019 | Tankersley et al. | |
| 2019/0102469 A1 | 4/2019 | Makovsky et al. | |
| 2019/0121979 A1* | 4/2019 | Chari | G06F 21/566 |
| 2019/0132359 A1* | 5/2019 | Kraenzel | H04L 63/1491 |
| 2019/0163678 A1 | 5/2019 | Bath et al. | |
| 2019/0171725 A1 | 6/2019 | Shen et al. | |
| 2019/0196912 A1* | 6/2019 | Didehban | G06F 11/1407 |
| 2019/0230095 A1 | 7/2019 | McGrew et al. | |
| 2019/0236149 A1 | 8/2019 | Kuruvada et al. | |
| 2019/0245734 A1* | 8/2019 | Wu | H04L 41/12 |
| 2019/0245763 A1* | 8/2019 | Wu | H04L 41/22 |
| 2019/0266999 A1 | 8/2019 | Chandrasekaran | G10L 15/16 |
| 2019/0303198 A1* | 10/2019 | Kim | G06N 3/04 |
| 2019/0340554 A1* | 11/2019 | Dotan-Cohen | G06Q 10/06313 |
| 2019/0372828 A1 | 12/2019 | Wu et al. | |
| 2019/0387005 A1* | 12/2019 | Zawoad | H04L 63/1408 |
| 2020/0034528 A1* | 1/2020 | Yang | G06F 21/6209 |
| 2020/0067952 A1 | 2/2020 | Deaguero et al. | |
| 2020/0082081 A1* | 3/2020 | Sarin | H04W 12/08 |
| 2020/0099703 A1* | 3/2020 | Singh | H04L 63/1408 |
| 2020/0220849 A1 | 7/2020 | Zaifman et al. | |
| 2020/0236131 A1* | 7/2020 | Vejman | H04L 63/1416 |
| 2020/0287885 A1 | 9/2020 | Rodniansky | |
| 2020/0321087 A1* | 10/2020 | Willis | G16H 70/00 |
| 2020/0389469 A1 | 12/2020 | Litichever et al. | |
| 2021/0006589 A1 | 1/2021 | Kohout et al. | |
| 2021/0185087 A1 | 6/2021 | Wu et al. | |
| 2021/0218714 A1* | 7/2021 | Wang | H04L 63/166 |
| 2021/0250368 A1 | 8/2021 | Hearty et al. | |
| 2021/0288993 A1* | 9/2021 | Kraning | H04L 63/1408 |
| 2021/0360004 A1 | 11/2021 | McGrew et al. | |
| 2021/0360011 A1 | 11/2021 | O'Hara et al. | |
| 2022/0019688 A1* | 1/2022 | Nelluri | G06N 20/00 |
| 2022/0070188 A1* | 3/2022 | Sheedy | H04L 63/1408 |
| 2022/0224716 A1* | 7/2022 | Salji | H04L 63/1416 |

FOREIGN PATENT DOCUMENTS

| | | |
|---|---|---|
| CN | 105071987 A | 11/2015 |
| CN | 105323247 A | 2/2016 |
| CN | 106170008 A | 11/2016 |
| CN | 106341375 A | 1/2017 |
| CN | 107646190 A | 1/2018 |
| CN | 107667510 A | 2/2018 |
| CN | 106533665 B | 8/2018 |
| CN | 109104441 A | 12/2018 |
| CN | 109542772 A1 | 3/2019 |
| CN | 110113349 A | 8/2019 |
| CN | 107667510 B | 11/2020 |
| CN | 112085039 A | 12/2020 |
| CN | 112398876 A | 2/2021 |
| CN | 107646190 B | 3/2021 |
| DE | 69533953 T2 | 4/2006 |
| EP | 0702477 A2 | 3/1996 |
| EP | 0702477 A3 | 7/1999 |
| EP | 1026867 A2 | 8/2000 |
| EP | 0702477 B1 | 1/2005 |
| EP | 1579629 A2 | 9/2005 |
| EP | 2057576 A2 | 5/2009 |
| EP | 1579629 A4 | 11/2009 |
| EP | 2215801 B1 | 4/2011 |
| EP | 2057576 A4 | 4/2012 |
| EP | 3089424 A1 | 11/2016 |
| EP | 3094061 A1 | 11/2016 |
| EP | 3113443 A1 | 1/2017 |
| EP | 3306890 A1 | 4/2018 |
| EP | 3394784 B1 | 10/2020 |
| EP | 3272095 B1 | 3/2021 |
| FR | 2924552 A1 | 6/2009 |
| GB | 2545910 A | 7/2017 |
| GB | 2545910 B | 2/2018 |
| KR | 960012819 A | 4/1996 |
| KR | 100388606 B1 | 11/2003 |
| KR | 20140093060 A | 7/2014 |
| KR | 101662614 B1 | 10/2016 |
| NZ | 586270 A | 12/2011 |
| WO | 2004040423 A2 | 5/2004 |
| WO | 2004040423 A3 | 5/2004 |
| WO | 2008026212 A2 | 3/2008 |
| WO | 2008026212 A3 | 3/2008 |
| WO | 2009015461 A1 | 2/2009 |
| WO | 2009068603 A2 | 6/2009 |
| WO | 2015128613 A1 | 9/2015 |
| WO | 2016118131 A1 | 7/2016 |
| WO | 2016144932 A1 | 9/2016 |
| WO | 2016146610 A1 | 9/2016 |
| WO | 2016191486 A1 | 12/2016 |
| WO | 2017108575 A1 | 6/2017 |
| WO | 2017108576 A1 | 6/2017 |
| WO | 2020131740 A1 | 6/2020 |

(56) References Cited

OTHER PUBLICATIONS

Office Communication for U.S. Appl. No. 16/718,050 dated Jul. 27, 2021, pp. 1-23.
Office Communication for U.S. Appl. No. 15/971,843 dated Jul. 28, 2021, pp. 1-9.
Office Communication for U.S. Appl. No. 15/585,887 dated Aug. 17, 2021, pp. 1-41.
Office Communication for U.S. Appl. No. 16/820,582 dated Sep. 27, 2021, pp. 1-25.
Office Communication for U.S. Appl. No. 16/679,055 dated Oct. 12, 2021, pp. 1-3.
Office Communication for U.S. Appl. No. 17/351,866 dated Oct. 18, 2021, pp. 1-12.
Office Communication for U.S. Appl. No. 17/337,299 dated Oct. 21, 2021, pp. 1-34.
Office Communication for U.S. Appl. No. 15/585,887 dated Nov. 2, 2021, pp. 1-4.
Office Communication for U.S. Appl. No. 16/679,055 dated Nov. 12, 2021, pp. 1-34.
Office Communication for U.S. Appl. No. 17/483,435 dated Nov. 30, 2021, pp. 1-21.
Office Communication for U.S. Appl. No. 16/989,343 dated Aug. 17, 2022, pp. 1-5.
Office Communication for U.S. Appl. No. 15/585,887 dated Sep. 1, 2022, pp. 1-39.
Office Communication for U.S. Appl. No. 17/861,373 dated Sep. 9, 2022, pp. 1-18.
Office Communication for U.S. Appl. No. 17/318,423 dated Sep. 13, 2022, pp. 1-15.
Office Communication for U.S. Appl. No. 17/721,514 dated Sep. 20, 2022, pp. 1-8.
Office Communication for U.S. Appl. No. 16/679,055 dated Sep. 21, 2022, pp. 1-25.
Office Communication for U.S. Appl. No. 17/318,423 dated Sep. 22, 2022, pp. 1-2.
Office Communication for U.S. Appl. No. 16/679,055 dated Sep. 28, 2022, pp. 1-2.
Office Communication for U.S. Appl. No. 17/708,311 dated Oct. 5, 2022, pp. 1-15.
Office Communication for U.S. Appl. No. 17/515,963 dated Oct. 7, 2022, pp. 1-27.
Office Communication for U.S. Appl. No. 17/721,514 dated Oct. 11, 2022, pp. 1-2.
Office Communication for U.S. Appl. No. 17/516,063 dated Oct. 31, 2022, pp. 1-10.
Office Communication for U.S. Appl. No. 15/971,843 dated May 5, 2021, pp. 1-9.
Office Communication for U.S. Appl. No. 16/820,582 dated May 10, 2021, pp. 1-24.
Office Communication for U.S. Appl. No. 16/525,290 dated Jun. 15, 2021, pp. 1-4.
Examination Report for European Patent Application No. 17210996.9 dated May 21, 2021, pp. 1-6.
Office Communication for U.S. Appl. No. 16/525,290 dated Jul. 9, 2021, pp. 1-7.
Office Communication for U.S. Appl. No. 16/679,055 dated May 11, 2022, pp. 1-3.
Office Communication for U.S. Appl. No. 16/813,649 dated May 11, 2022, pp. 1-16.
Beckett, David et al., "New Sensing Technique for Detecting Application Layer DDoS Attacks Targeting Back-end Database Resources," IEEE International Conference on Communications (ICC 2017), May 2017, pp. 1-7.
Office Communication for U.S. Appl. No. 16/989,025 dated May 23, 2022, pp. 1-14.
Office Communication for U.S. Appl. No. 16/679,055 dated Jun. 3, 2022, pp. 1-34.
Office Communication for U.S. Appl. No. 17/708,311 dated Jun. 20, 2022, pp. 1-15.
Office Communication for U.S. Appl. No. 17/722,217 dated Jun. 29, 2022, pp. 1-23.
Office Communication for U.S. Appl. No. 17/226,947 dated Jul. 11, 2022, pp. 1-13.
Office Communication for U.S. Appl. No. 17/722,217 dated Jul. 15, 2022, pp. 1-7.
Office Communication for U.S. Appl. No. 17/721,514 dated Jul. 21, 2022, pp. 1-7.
Office Communication for U.S. Appl. No. 16/989,343 dated Aug. 11, 2022, pp. 1-9.
Office Communication for U.S. Appl. No. 13/831,673 dated Sep. 30, 2013, pp. 1-10.
Office Communication for U.S. Appl. No. 13/831,673 dated Mar. 6, 2014, pp. 1-12.
Office Communication for U.S. Appl. No. 13/831,673 dated May 22, 2014, pp. 1-5.
Office Communication for U.S. Appl. No. 13/831,626 dated Sep. 3, 2013, pp. 1-17.
Office Communication for U.S. Appl. No. 13/831,959 dated Aug. 22, 2013, pp. 1-9.
Handel, Theodore G. et al., "Hiding data in the OSI network model." In: Anderson R. (eds) Information Hiding. IH 1996. Lecture Notes in Computer Science, vol. 1174. Springer, Berlin, Heidelberg. pp. 23-38.
Office Communication for U.S. Appl. No. 14/500,893 dated Nov. 20, 2014, pp. 1-15.
Office Communication for U.S. Appl. No. 14/107,580 dated Mar. 6, 2014, pp. 1-13.
Office Communication for U.S. Appl. No. 14/107,580 dated Sep. 15, 2014, pp. 1-15.
Office Communication for U.S. Appl. No. 13/831,908 dated Aug. 9, 2013, pp. 1-29.
Office Communication for U.S. Appl. No. 13/831,908 dated Jan. 13, 2014, pp. 1-31.
Office Communication for U.S. Appl. No. 13/831,908 dated Apr. 9, 2014, pp. 1-3.
Office Communication for U.S. Appl. No. 13/831,908 dated Jun. 25, 2014, pp. 1-15.
Office Communication for U.S. Appl. No. 14/518,996 dated Nov. 20, 2014, pp. 1-41.
Office Communication for U.S. Appl. No. 14/107,631 dated Feb. 20, 2014, pp. 1-16.
Office Communication for U.S. Appl. No. 14/107,631 dated Sep. 26, 2014, pp. 1-14.
Office Communication for U.S. Appl. No. 14/107,631 dated Dec. 30, 2014, pp. 1-12.
Handley, Mark et al., "Network Intrusion Detection: Evasion, Traffic Normalization, and End-to-tnd Protocol Semantics," 2011, International Computer Science Institute, pp. 1-17.
Information Sciences Institute, "Internet Protocol Darpa Internet Program Protocol Specification," Sep. 1981, pp. 1-36.
Fuertes, Juan Antonio Cordero, "Evaluation of OSPF Extensions in MANET Routing," Paris, 2007, pp. 1-192.
Parsons, Christopher, "Moving Across the Internet: Code-Bodies, Code-Corpses, and Network Architecture," May 9, 2010, pp. 1-20.
Zander, Sebastian et al., "Covert Channels and Countermeasures in Computer Network Protocols," Dec. 2007, pp. 1-7.
Office Communication for U.S. Appl. No. 14/107,580 dated Mar. 17, 2015, pp. 1-5.
Lin, Mark, "An Overview of Session Hijacking at the Network and Application Levels," Jan. 18, 2005, pp. 1-16.
U.S. Appl. No. 11/683,643, filed Mar. 8, 2007, pp. 1-48.
U.S. Appl. No. 11/679,356, filed Feb. 27, 2007, pp. 1-45.
Office Communication for U.S. Appl. No. 12/326,672 dated Jun. 9, 2010, pp. 1-9.
Office Communication for U.S. Appl. No. 12/326,672 dated Dec. 23, 2010, pp. 1-15.
Office Communication for U.S. Appl. No. 12/326,672 dated Jun. 22, 2011, pp. 1-16.
Office Communication for U.S. Appl. No. 12/326,672 dated Oct. 24, 2011, pp. 1-9.
Office Communication for U.S. Appl. No. 11/683,643 dated Apr. 28, 2010, pp. 1-35.

(56) References Cited

OTHER PUBLICATIONS

Office Communication for U.S. Appl. No. 11/683,643 dated Oct. 14, 2010, pp. 1-43.
Office Communication for U.S. Appl. No. 11/683,643 dated Aug. 25, 2011, pp. 1-43.
Office Communication for U.S. Appl. No. 11/683,643 dated Jan. 23, 2012, pp. 1-22.
Office Communication for U.S. Appl. No. 15/014,932 dated Jun. 10, 2016, pp. 1-20.
Office Communication for U.S. Appl. No. 15/207,213 dated Oct. 25, 2016, pp. 1-18.
Office Communication for U.S. Appl. No. 15/014,932 dated Dec. 14, 2016, pp. 1-26.
Digital Imaging and Communications in Medicine (DICOM), Part 6: Data Dictionary, PS 3.6-2011. 2011, http://dicom.nema.org/Dicom/2011/11_06pu.pdf, pp. 1-216.
Health Level Seven, Version 2.6, Appendix A. Nov. 2007, https://www.hl7.org/special/committees/vocab/V26_Appendix_A.pdf, pp. 1-255.
Office Communication for U.S. Appl. No. 15/207,213 dated Feb. 23, 2017, pp. 1-24.
Office Communication for U.S. Appl. No. 15/014,932 dated Mar. 3, 2017, pp. 1-6.
Office Communication for U.S. Appl. No. 15/207,213 dated May 8, 2017, pp. 1-6.
Office Communication for U.S. Appl. No. 15/207,213 dated Jun. 1, 2017, pp. 1-24.
Office Communication for U.S. Appl. No. 15/014,932 dated Aug. 1, 2017, pp. 1-27.
Office Communication for U.S. Appl. No. 15/690,135 dated Jan. 18, 2018, pp. 1-6.
Office Communication for U.S. Appl. No. 15/891,311 dated Apr. 23, 2018, pp. 1-18.
Office Communication for U.S. Appl. No. 15/892,327 dated Apr. 23, 2018, pp. 1-6.
Office Communication for U.S. Appl. No. 15/014,932 dated May 15, 2018, pp. 1-23.
Office Communication for U.S. Appl. No. 15/891,273 dated Jun. 19, 2018, pp. 1-20.
Office Communication for U.S. Appl. No. 15/014,932 dated Jul. 16, 2018, pp. 1-4.
Office Communication for U.S. Appl. No. 15/690,135 dated May 22, 2018, pp. 1-7.
Office Communication for U.S. Appl. No. 15/984,197 dated Aug. 31, 2018, pp. 1-25.
Office Communication for U.S. Appl. No. 15/891,311 dated Sep. 24, 2018, pp. 1-14.
Office Communication for U.S. Appl. No. 16/048,939 dated Sep. 19, 2018, pp. 1-9.
Office Communication for U.S. Appl. No. 16/113,442 dated Nov. 6, 2018, pp. 1-10.
Office Communication for U.S. Appl. No. 16/100,116 dated Nov. 15, 2018, pp. 1-7.
Office Communication for U.S. Appl. No. 15/014,932 dated Nov. 23, 2018, pp. 1-10.
Office Communication for U.S. Appl. No. 16/107,509 dated Oct. 26, 2018, pp. 1-26.
Office Communication for U.S. Appl. No. 15/891,273 dated Jan. 15, 2019, pp. 1-23.
Office Communication for U.S. Appl. No. 15/891,311 dated Jan. 29, 2019, pp. 1-8.
Office Communication for U.S. Appl. No. 16/174,051 dated Jan. 29, 2019, pp. 1-21.
Office Communication for U.S. Appl. No. 15/671,060 dated May 8, 2019, pp. 1-19.
Office Communication for U.S. Appl. No. 16/113,442 dated Jun. 5, 2019, pp. 1-8.
Office Communication for U.S. Appl. No. 15/891,273 dated May 28, 2019, pp. 1-14.
Office Communication for U.S. Appl. No. 16/107,509 dated Apr. 1, 2019, pp. 1-21.
Office Communication for U.S. Appl. No. 16/048,939 dated Jun. 20, 2019, pp. 1-8.
Office Communication for U.S. Appl. No. 16/100,116 dated May 30, 2019, pp. 1-5.
Office Communication for U.S. Appl. No. 16/384,574 dated May 31, 2019, pp. 1-12.
Office Communication for U.S. Appl. No. 16/107,509 dated Jun. 14, 2019, pp. 1-5.
Office Communication for U.S. Appl. No. 16/107,509 dated Aug. 21, 2019, pp. 1-25.
Office Communication for U.S. Appl. No. 16/384,574 dated Oct. 8, 2019, pp. 1-13.
Office Communication for U.S. Appl. No. 16/543,243 dated Sep. 27, 2019, pp. 1-24.
Office Communication for U.S. Appl. No. 16/048,939 dated Dec. 5, 2019, pp. 1-9.
Office Communication for U.S. Appl. No. 16/565,109 dated Nov. 27, 2019, pp. 1-18.
Office Communication for U.S. Appl. No. 16/525,290 dated Oct. 31, 2019, pp. 1-9.
Office Communication for U.S. Appl. No. 16/532,275 dated Oct. 24, 2019, pp. 1-29.
Office Communication for U.S. Appl. No. 16/560,886 dated Dec. 6, 2019, pp. 1-17.
Office Communication for U.S. Appl. No. 14/500,893 dated Feb. 18, 2015, pp. 1-11.
Office Communication for U.S. Appl. No. 14/518,996 dated Apr. 20, 2015, pp. 1-37.
Office Communication for U.S. Appl. No. 14/500,893 dated Jun. 15, 2015, pp. 1-12.
Office Communication for U.S. Appl. No. 14/518,996 dated Jul. 21, 2015, pp. 1-17.
Office Communication for U.S. Appl. No. 14/695,690 dated Sep. 9, 2015, pp. 1-41.
Office Communication for U.S. Appl. No. 14/695,690 dated Feb. 24, 2016, pp. 1-11.
Office Communication for U.S. Appl. No. 15/150,354 dated Jul. 5, 2016, pp. 1-18.
Mozilla Developer Network, "NSS Key Log Format," https://developer.mozilla.org/en-US/docs/Mozilla/Projects/NSS/Key__Log_Format, Jan. 8, 2010, p. 1.
Extended European Search Report for European Patent Application No. 16166907.2 dated Sep. 30, 2016, pp. 1-7.
Office Communication for U.S. Appl. No. 15/150,354 dated Feb. 8, 2017, pp. 1-8.
Office Communication for U.S. Appl. No. 15/466,248 dated Jun. 5, 2017, pp. 1-30.
Office Communication for U.S. Appl. No. 15/466,248 dated Oct. 3, 2017, pp. 1-34.
Office Communication for U.S. Appl. No. 15/457,886 dated Jan. 5, 2018, pp. 1-11.
Office Communication for U.S. Appl. No. 15/466,248 dated Jan. 11, 2018, pp. 1-2.
Examination Report for European Patent Application No. 16166907.2 dated Mar. 9, 2018, pp. 1-4.
Shaver, Jim, "Decrypting TLS Browser Traffic with Wireshark the easy way", https://jimshaver.net/2015/02/11/decrypting-tls-browser-traffic-with-wireshark-the-easy-way/, Feb. 11, 2015, pp. 1-30.
Office Communication for U.S. Appl. No. 15/466,248 dated Mar. 8, 2018, pp. 1-34.
Office Communication for U.S. Appl. No. 15/457,886 dated Jul. 18, 2018, pp. 1-11.
Office Communication for U.S. Appl. No. 15/466,248 dated Jul. 11, 2018, pp. 1-31.
International Search Report and Written Opinion for International Patent Application No. PCT/US2017/068585 dated Jul. 4, 2018, pp. 1-11.
Extended European Search Report for European Patent Application No. 17210995.1 dated Jul. 6, 2018, pp. 1-11.
Office Communication for U.S. Appl. No. 15/466,248 dated Oct. 18, 2018, pp. 1-31.

(56) References Cited

OTHER PUBLICATIONS

Office Communication for U.S. Appl. No. 15/457,886 dated Mar. 20, 2019, pp. 1-9.
Office Communication for U.S. Appl. No. 17/483,148 dated Dec. 13, 2021, pp. 1-28.
Office Communication for U.S. Appl. No. 16/813,649 dated Dec. 20, 2021, pp. 1-44.
Office Communication for U.S. Appl. No. 17/226,947 dated Dec. 30, 2021, pp. 1-6.
Office Communication for U.S. Appl. No. 16/820,582 dated Jan. 14, 2022, pp. 1-13.
Office Communication for U.S. Appl. No. 16/989,025 dated Jan. 19, 2022, pp. 1-12.
Supplementary European Search Report for European Patent Application No. 19804040.4 dated Jan. 25, 2022, pp. 1-4.
Office Communication for U.S. Appl. No. 17/351,866 dated Feb. 9, 2022, pp. 1-9.
International Search Report and Written Opinion for International Patent Application No. PCT/US2021/051757 dated Jan. 11, 2022, pp. 1-9.
"Kerberos Overview—An Authentication Service for Open Network Systems," Cisco Systems, Inc., Jan. 19, 2006, https://www.cisco.com/c/en/us/support/docs/security-vpn/kerberos/16087-1.html, Accessed: Feb. 9, 2022, pp. 1-16.
Office Communication for U.S. Appl. No. 17/337,299 dated Feb. 17, 2022, pp. 1-14.
Office Communication for U.S. Appl. No. 16/679,055 dated Mar. 2, 2022, pp. 1-35.
Office Communication for U.S. Appl. No. 15/585,887 dated Mar. 24, 2022, pp. 1-40.
Office Communication for U.S. Appl. No. 17/318,423 dated Mar. 29, 2022, pp. 1-21.
Office Communication for U.S. Appl. No. 16/989,343 dated Mar. 29, 2022, pp. 1-5.
Office Communication for U.S. Appl. No. 16/813,649 dated Apr. 1, 2022, pp. 1-4.
Extended European Search Report for European Patent Application No. 19846527.0 dated Apr. 4, 2022, pp. 1-9.
Conry-Murray, Andrew, "Security Event Management Gets Specialized," Network Magazine, CMP Media, vol. 20, Nov. 2005, pp. 1-6.
Office Communication for U.S. Appl. No. 15/585,887 dated Nov. 21, 2022, pp. 1-6.
Office Communication for U.S. Appl. No. 17/708,311 dated Dec. 21, 2022, pp. 1-4.
Office Communication for U.S. Appl. No. 15/585,887 dated Dec. 22, 2022, pp. 1-38.
Office Communication for U.S. Appl. No. 17/861,373 dated Jan. 11, 2023, pp. 1-10.
Office Communication for U.S. Appl. No. 17/861,373 dated Jan. 19, 2023, pp. 1-2.
Office Communication for U.S. Appl. No. 17/515,963 dated Jan. 24, 2023, pp. 1-8.
Office Communication for U.S. Appl. No. 17/515,963 dated Feb. 1, 2023, pp. 1-2.
Office Communication for U.S. Appl. No. 16/718,050 dated Sep. 4, 2020, pp. 1-23.
Office Communication for U.S. Appl. No. 16/525,290 dated Sep. 23, 2020, pp. 1-10.
International Search Report and Written Opinion for International Patent Application No. PCT/US2019/030015 dated Aug. 7, 2019, pp. 1-6.
International Search Report and Written Opinion for International Patent Application No. PCT/US2019/018097 dated May 28, 2019, pp. 1-9.
Office Communication for U.S. Appl. No. 15/971,843 dated Oct. 27, 2020, pp. 1-11.
Office Communication for U.S. Appl. No. 16/424,387 dated Nov. 24, 2020, pp. 1-23.
Office Communication for U.S. Appl. No. 16/543,243 dated Dec. 16, 2020, pp. 1-13.
Office Communication for U.S. Appl. No. 16/565,109 dated Jan. 19, 2021, pp. 1-9.
Office Communication for U.S. Appl. No. 16/813,649 dated Feb. 24, 2021, pp. 1-7.
Office Communication for U.S. Appl. No. 16/679,055 dated Mar. 16, 2021, pp. 1-33.
Office Communication for U.S. Appl. No. 15/585,887 dated Mar. 26, 2021, pp. 1-31.
Office Communication for U.S. Appl. No. 16/525,290 dated Mar. 31, 2021, pp. 1-11.
Office Communication for U.S. Appl. No. 15/466,248 dated May 16, 2019, pp. 1-33.
Office Communication for U.S. Appl. No. 15/466,248 dated Sep. 10, 2019, pp. 1-27.
Office Communication for U.S. Appl. No. 15/971,843 dated Oct. 22, 2019, pp. 1-15.
Office Communication for U.S. Appl. No. 14/750,905 dated Sep. 22, 2015, pp. 1-12.
Office Communication for U.S. Appl. No. 14/750,905 dated Jan. 19, 2016, pp. 1-5.
Office Communication for U.S. Appl. No. 15/082,925 dated Sep. 13, 2016, pp. 1-7.
Office Communication for U.S. Appl. No. 15/289,760 dated Dec. 12, 2016, pp. 1-12.
Office Communication for U.S. Appl. No. 15/219,016 dated Nov. 22, 2016, pp. 1-12.
Office Communication for U.S. Appl. No. 15/356,381 dated Jan. 6, 2017, pp. 1-57.
Office Communication for U.S. Appl. No. 15/082,925 dated Feb. 1, 2017, pp. 1-6.
Office Communication for U.S. Appl. No. 15/219,016 dated Mar. 16, 2017, pp. 1-9.
Office Communication for U.S. Appl. No. 15/443,868 dated Apr. 27, 2017, pp. 1-7.
Office Communication for U.S. Appl. No. 15/585,887 dated Jun. 27, 2017, pp. 1-24.
Office Communication for U.S. Appl. No. 15/356,381 dated Jul. 3, 2017, pp. 1-21.
Office Communication for U.S. Appl. No. 15/675,216 dated Jun. 7, 2018, pp. 1-4.
Office Communication for U.S. Appl. No. 15/443,868 dated Aug. 11, 2017, pp. 1-11.
Office Communication for U.S. Appl. No. 15/675,216 dated Nov. 20, 2017, pp. 1-7.
Office Communication for U.S. Appl. No. 15/585,887 dated Nov. 28, 2017, pp. 1-23.
International Search Report and Written Opinion for International Patent Application No. PCT/US2018/030145 dated Aug. 10, 2018, pp. 1-12.
Svoboda, Jakub, "Network Traffic Analysis with Deep Packet Inspection Method," Masaryk University, Faculty of Informatics, Master's Thesis, 2014, pp. 1-74.
International Search Report and Written Opinion for International Patent Application No. PCT/US2017/068586 dated Aug. 9, 2018, pp. 1-14.
Extended European Search Report for European Patent Application No. 17210996.9 dated Jun. 13, 2018, pp. 1-7.
Office Communication for U.S. Appl. No. 15/855,769 dated Feb. 5, 2019, pp. 1-10.
Office Communication for U.S. Appl. No. 15/855,769 dated May 1, 2019, pp. 1-7.
Office Communication for U.S. Appl. No. 16/459,472 dated Aug. 14, 2019, pp. 1-15.
Office Communication for U.S. Appl. No. 15/585,887 dated Mar. 20, 2019, pp. 1-26.
Office Communication for U.S. Appl. No. 15/675,216 dated Aug. 28, 2018, pp. 1-14.
Office Communication for U.S. Appl. No. 15/675,216 dated Jan. 29, 2019, pp. 1-8.
Office Communication for U.S. Appl. No. 16/384,697 dated May 30, 2019, pp. 1-12.

(56) References Cited

OTHER PUBLICATIONS

Office Communication for U.S. Appl. No. 16/384,574 dated Jan. 13, 2020, pp. 1-9.
Office Communication for U.S. Appl. No. 16/107,509 dated Jan. 23, 2020, pp. 1-12.
Office Communication for U.S. Appl. No. 15/585,887 dated Jan. 22, 2020, pp. 1-28.
Office Communication for U.S. Appl. No. 16/384,697 dated Oct. 17, 2019, pp. 1-8.
Office Communication for U.S. Appl. No. 16/459,472 dated Feb. 3, 2020, pp. 1-7.
Office Communication for U.S. Appl. No. 16/679,055 dated Feb. 14, 2020, pp. 1-32.
Office Communication for U.S. Appl. No. 16/048,939 dated Feb. 18, 2020, pp. 1-6.
Office Communication for U.S. Appl. No. 16/424,387 dated Feb. 24, 2020, pp. 1-15.
Office Communication for U.S. Appl. No. 16/718,050 dated Feb. 27. 2020, pp. 1-21.
Wade, Susan Susan Marie, ""Scada Honeynets: The attractiveness of honeypots as critical infrastructure security tools for the detection and analysis of advanced threats"" (2011). Graduate Theses and Dissertations. 12138. https://lib.dr.lastate.edu/etd/12138, pp. 1-67.
Office Communication for U.S. Appl. No. 16/525,290 dated Mar. 12, 2020, pp. 1-10.
Office Communication for U.S. Appl. No. 15/971,843 dated Mar. 26, 2020, pp. 1-14.
Office Communication for U.S. Appl. No. 16/048,939 dated Mar. 26, 2020, pp. 1-6.
Office Communication for U.S. Appl. No. 16/543,243 dated Apr. 7, 2020, pp. 1-22.
Office Communication for U.S. Appl. No. 16/532,275 dated Apr. 20, 2020, pp. 1-8.
Office Communication for U.S. Appl. No. 16/560,886 dated Apr. 22, 2020, pp. 1-10.
Office Communication for U.S. Appl. No. 16/565,109 dated May 8, 2020, pp. 1-19.
Examination Report for European Patent Application No. 16166907.2 dated Dec. 19, 2019, pp. 1-6.
Examination Report for European Patent Application No. 17210996.9 dated May 27, 2020, pp. 1-3.
Office Communication for U.S. Appl. No. 15/585,887 dated Aug. 28, 2020, pp. 1-30.
Office Communication for U.S. Appl. No. 16/679,055 dated Sep. 4, 2020, pp. 1-5.

* cited by examiner

DETECTING INJECTION ATTACKS USING PASSIVE NETWORK MONITORING

CROSS-REFERENCE TO RELATED APPLICATION(S)

This Utility Patent Application is a Continuation of U.S. patent application Ser. No. 16/424,387 filed on May 28, 2019, now U.S. Pat. No. 10,965,702 issued on Mar. 30, 2021, the benefit of which is claimed under 35 U.S.C. § 120, and the contents of which is further incorporated in entirety by reference.

TECHNICAL FIELD

The present invention relates generally to network monitoring, and more particularly, but not exclusively, to monitoring networks in a distributed network monitoring environment.

BACKGROUND

On most computer networks, bits of data arranged in bytes are packaged into collections of bytes called packets. These packets are generally communicated between computing devices over networks in a wired or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transmission Control Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. They may receive these packet copies through a port mirror on a managed Ethernet switch, e.g., a Switched Port Analyzer (SPAN) port, a Roving Analysis Port (RAP), or the like, or combinations thereof. Port mirroring enables analysis and debugging of network communications. Port mirroring can be performed for inbound or outbound traffic (or both) on single or multiple interfaces. In other instances, packet copies may be provided to the network monitors from a specialized network tap or from a software entity running on the client or server. In virtual environments, port mirroring may be performed on a virtual switch that is incorporated within the hypervisor.

In complex networks, network activity, such as, requests or responses directed to one device, server, service, or application may be responsible for causing related activity that may be associated with other devices, servers, services, or applications in the network. Correlating activity that is associated with different devices, servers, services, or applications may be difficult absent disadvantageous or intrusive monitoring mechanisms. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
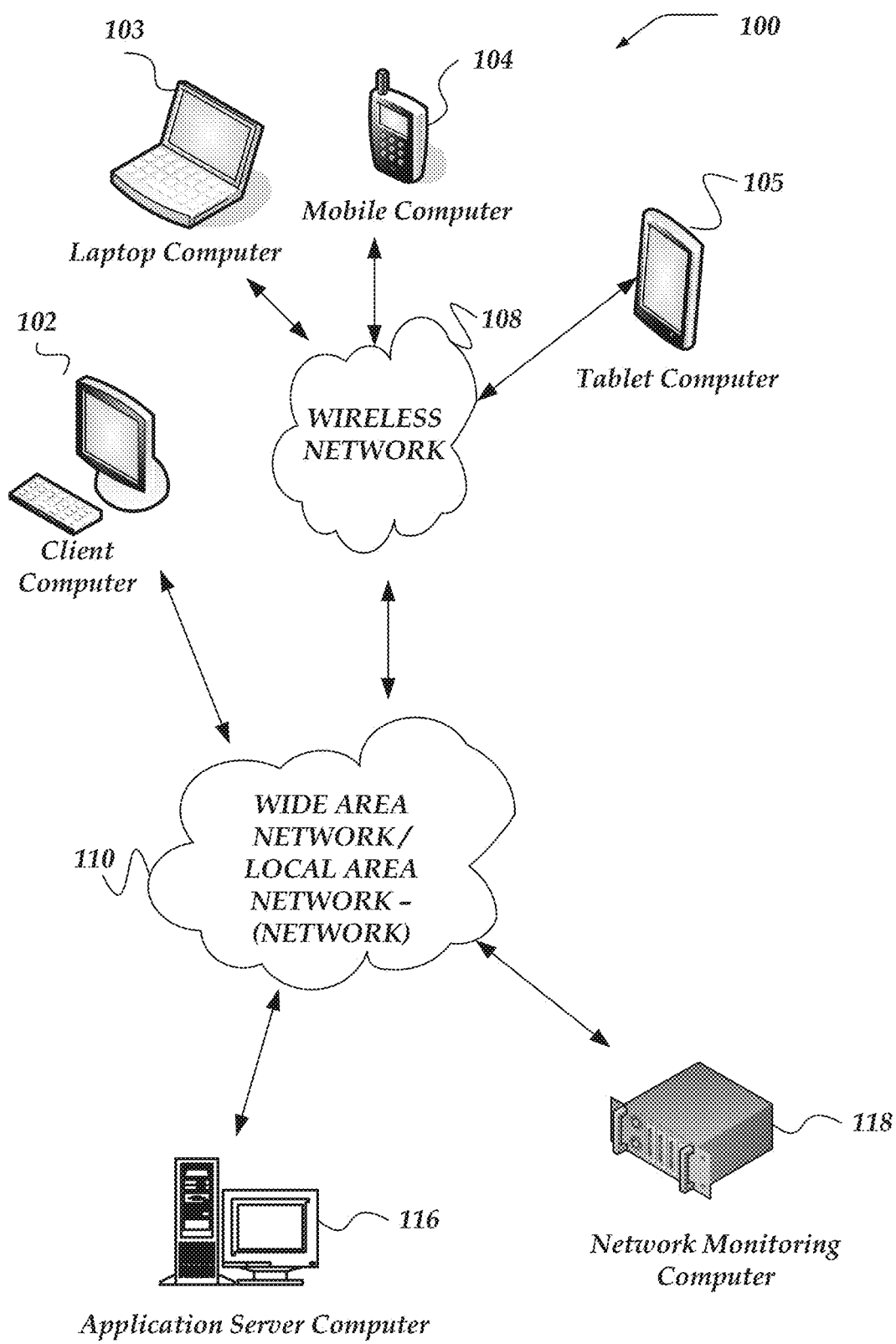
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "network flow" refer to one or more network packets or a stream of network packets that are communicated in a session that is established between at least two endpoints, such as two network devices. In one or more of the various embodiments, flows may be useful if one or more of the endpoints of a session may be behind a network traffic management device, such as a firewall, switch, router, load balancer, or the like. In one or more of the various embodiments, such flows may be used to ensure that the packets sent between the endpoints of a flow may be routed appropriately.

Typically, establishing a TCP based connection between endpoints begins with the execution of an initialization protocol and creates a single bi-directional flow between two endpoints, e.g., one direction of flow going from endpoint A to endpoint B, the other direction of the flow going from endpoint B to endpoint A, where each endpoint is at least identified by an IP address and a TCP port.

Also, some protocols or network applications may establish a separate flow for control information that enables management of at least one or more flows between two or more endpoints. Further, in some embodiments, network flows may be half-flows that may be unidirectional.

As used herein, the terms "tuple," or "tuple information" refer to a set of values that identify a source and destination of a network packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein the term "related flows," or "related network flows" as used herein are network flows that while separate they are operating cooperatively. For example, some protocols, such as, FTP, SIP, RTP, VOIP, custom protocols, or the like, may provide control communication over one network flow and data communication over other network flows. Further, configuration rules may define one or more criteria that are used to recognize that two or more network flows should be considered related flows. For example, configuration rules may define that flows containing a particular field value should be grouped with other flows having the same field value, such as, a cookie value, or the like.

As used herein, the terms "network monitor", "network monitoring computer", or "NMC" refer to an application (software, hardware, or some combination thereof) that is arranged to monitor or record flows of packets in a session that are communicated between at least two endpoints over at least one network. The NMC can provide information for assessing different aspects of these monitored flows. In one or more embodiments, the NMC may passively monitor network packet traffic without participating in the communication protocols. This monitoring may be performed for a variety of reasons, including troubleshooting and proactive remediation, anomaly detection, end-user experience monitoring, SLA monitoring, capacity planning, application lifecycle management, infrastructure change management, infrastructure optimization, business intelligence, security, and regulatory compliance. The NMC can receive network communication for monitoring through a variety of means including network taps, wireless receivers, port mirrors or directed tunnels from network switches, clients or servers including the endpoints themselves, or other infrastructure devices. In at least some of the various embodiments, the NMC may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, a Roving Analysis Port (RAP), or the like, or combination thereof. Port mirroring enables analysis and debugging of network communications. Port mirroring can be performed for inbound or outbound traffic (or both) on single or multiple interfaces.

The NMC may track network connections from and to end points such as a client or a server. The NMC may also extract information from the packets including protocol information at various layers of the communication protocol stack. The NMC may reassemble or reconstruct the stream of data exchanged between the endpoints. The NMC may perform decryption of the payload at various layers of the protocol stack. The NMC may passively monitor the network traffic or it may participate in the protocols as a proxy. The NMC may attempt to classify the network traffic according to communication protocols that are used.

The NMC may also perform one or more actions for classifying protocols that may be a necessary precondition for application classification. While some protocols run on well-known ports, others do not. Thus, even if there is traffic on a well-known port, it is not necessarily the protocol generally understood to be assigned to that port. As a result, the NMC may perform protocol classification using one or more techniques, such as, signature matching, statistical analysis, traffic analysis, and other heuristics. In some cases, the NMC may use adaptive protocol classification techniques where information used to classify the protocols may be accumulated or applied over time to further classify the observed protocols. In some embodiments, NMCs may be arranged to employ stateful analysis. Accordingly, for each supported protocols, an NMC may use network packet payload data to drive a state machine that mimics the protocol state changes in the client/server flows being monitored. The NMC may categorize the traffic where categories might include file transfers, streaming audio, streaming video, database access, interactive, gaming, and the like. The NMC may attempt to determine whether the traffic corresponds to known communications protocols, such as HTTP, FTP, SMTP, RTP, TDS, TCP, IP, and the like.

In addition, in one or more of the various embodiments, NMCs or NMC functionality may be implemented using hardware or software based proxy devices that may be arranged to intercept network traffic in the monitored networks rather than being restricted to passive (pass through) monitoring.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "entity" refers to an actor in the monitored network. Entities may include applications, services, programs, processes, network devices, network computers, client computers, or the like, operating in the monitored network. For example, individual entities may include, web clients, web servers, database clients, database servers, mobile app clients, payment processors, groupware clients, groupware services, or the like. In some cases, multiple entities may co-exist on or in the same network computer, process, application, compute container, or cloud compute instance.

As used herein, the term "observation port" refers to network taps, wireless receivers, port mirrors or directed tunnels from network switches, clients or servers, virtual machines, cloud computing instances, other network infrastructure devices or processes, or the like, or combination thereof. Observation ports may provide a copy of each network packet included in monitored wire traffic or monitored network traffic on a particular network segment or virtual local area network (VLAN). Also, for one or more of the various embodiments, observation ports may provide NMCs network packet copies through a port mirror on a managed Ethernet switch, e.g., a Switched Port Analyzer (SPAN) port, or a Roving Analysis Port (RAP).

As used herein the term, "injection attack" refers to a class of network borne attacks that usually involve the deliberate inclusion of untrusted, malicious or malformed code in inputs provided through otherwise trusted interfaces or APIs to a service in the hopes of causing degradation or exploitation of the targeted services or computers. In some cases, the malformed inputs may include computer executable code (or other data that a target may interpret as code or computer readable instructions) that an attacker hopes will be involuntarily executed on the targeted services or computers. For example, a SQL injection attack (described in more detail in the examples below) usually involves "injecting" untrusted SQL code into a request that may be provided to a server, in the hopes that the untrusted SQL code will be executed. There are many variants of injection attacks share the characteristic of attempting to inject untrusted content or computer readable instructions into a target via an otherwise trusted pathway.

As used herein, the term "correlation information" refers to information associated with one or more requests that may be determined from monitored network traffic. Correlation information may include, communication protocol information (e.g., one or more TCP field values, or the like), parameter or parameter values, URLs, some or all of the tuple information, or the like. In some cases, correlation information may include the some or all of payload or some or all of the network packet(s) associated with a request. Further, NMCs may associate different kinds of requests with different correlation information that includes different metrics, characteristics, or values. NMCs may be arranged to determine some or all of the correlation information based on configuration information.

As used herein the term, "configuration information" refers to information that may include rule based policies, pattern matching instructions (e.g., regular expressions), templates, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring network traffic using one or more network computers or network monitoring computers (NMCs). In one or more of the various embodiments, NMCs may be arranged to determine one or more requests that may be provided to a server based on a first portion of network traffic.

In one or more of the various embodiments, one or more suspicious requests may be determined based on one or more characteristics of the one or more provided requests. In one or more of the various embodiments, the one or more characteristics of the one or more suspicious requests may include, one or more of contents of the one or more suspicious requests, a sender of the one or more suspicious requests, a target of the one or more suspicious requests, tuple information, time of day, network utilization, or a rate of requests sent or received.

In one or more of the various embodiments, one or more characteristics of the one or more suspicious requests maybe employed to provide correlation information associated with at least the one or more suspicious requests.

In one or more of the various embodiments, one or more dependent actions performed by the server may be determined.

In one or more of the various embodiments, one or more characteristics of the one or more dependent actions may be determined to evaluate the one or more dependent actions.

In one or more of the various embodiments, the result of the one or more dependent actions performed by the server maybe determined. In one or more of the various embodiments, determining the one or more dependent actions may include comparing identifier information in a payload of one or more actions with other identifier information included in a payload of the one or more requests such that an affirmative result indicates that the one or more actions are the one or more dependent actions.

In one or more of the various embodiments, in response to determining anomalous activity associated with the evaluation of the one or more dependent actions based on one or more correlations with the one or more suspicious requests, one or more reports that include information associated with the anomalous activity may be provided. In one or more of the various embodiments, determining the anomalous activity may include: determining one or more inconsistencies associated with the one or more suspicious requests, or the one or more dependent requests; and further determining the anomalous activity based on the one or more determined inconsistencies. Also, in one or more of the various embodiments, determining the anomalous activity may include: determining malformed information that may be included in the one or more dependent actions based on an association with other malformed information that is included in the one or more suspicious requests; and further determining the anomalous activity based on one or more of the malformed information or the other malformed information.

In one or more of the various embodiments, a source of the anomalous activity may be determined based on one or more of the correlation information, the one or more suspicious requests, the one or more dependent actions, or the one or more results associated with the one or more dependent actions. And, in one or more of the various embodiments, the source of the anomalous activity may be included in the one or more reports.

In one or more of the various embodiments, the anomalous activity may include an injection attack based on malformed information included in the one or more suspicious requests that may be associated with malformed structured query language (SQL) instructions that may be included in the one or more dependent actions.

In one or more of the various embodiments, the anomalous activity may include an injection attack that may be based on malformed information included in the one or more suspicious requests that may be associated with one or more of one or more malformed shell instructions, malformed command instructions, or malformed interprocess communication associated with the one or more dependent actions.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, network monitoring computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, network monitoring computer 118, or other computers.

Client computers 102-105 may further be configured to include a client application that enables an end-user to log into an end-user account that may be managed by another computer, such as application server computer 116, network monitoring computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to network monitoring computer 118. Also, client computers may be arranged to enable users to display reports, interactive user-interfaces, results provided by network monitor computer 118, or the like. Further, in some embodiments, client computers may be arranged to receive or host one or more investigative agents that may be gathering information associated with an anomaly that has been detected in the networks.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, network monitoring computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116 is described in more detail below in conjunction with FIG. 3. One embodiment of network monitoring computer 118 is described in more detail below in conjunction with FIG. 3. Although FIG. 1 illustrates application server computer 116, and network monitoring computer 118, each as a single computer, the innovations or embodiments are not so limited. For example, one or more functions of application server computer 116, network monitoring computer 118, or the like, may be distributed across one or more distinct network computers. Moreover, in one or more embodiment, network monitoring computer 118 may be implemented using a plurality of network computers. Further, in one or more of the various embodiments, application server computer 116, or network monitoring computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
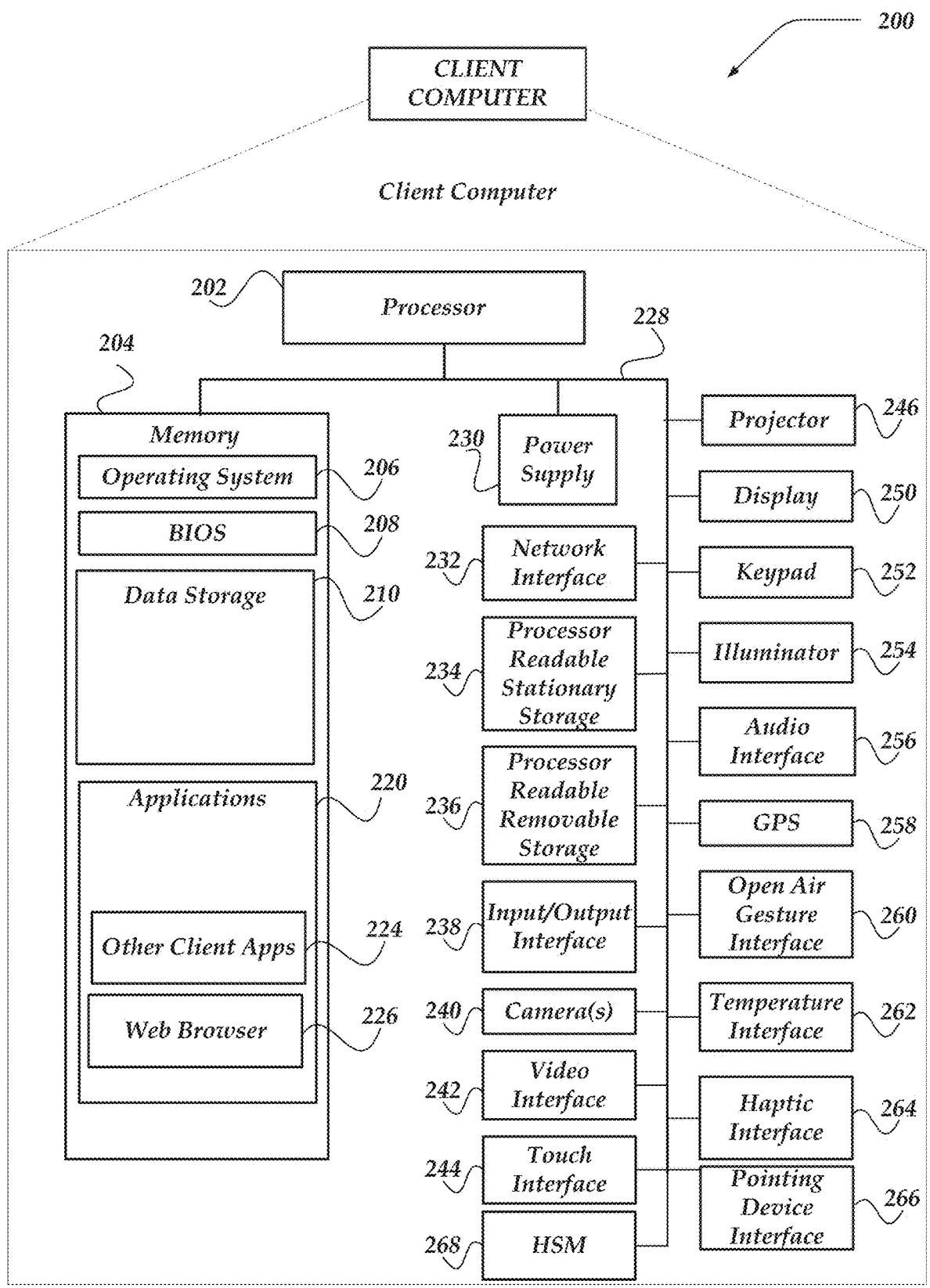
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX', or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
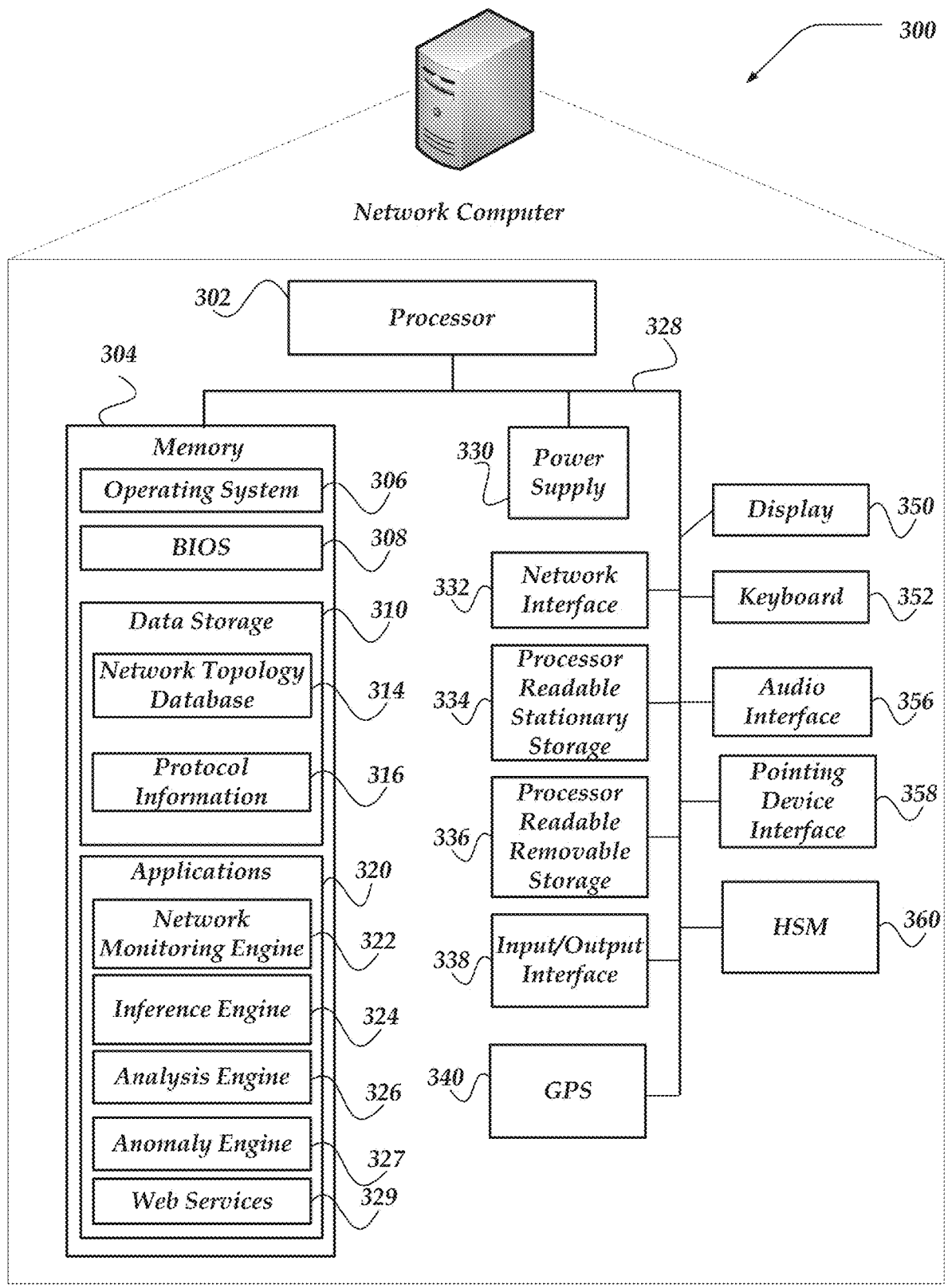
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or network monitoring computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, network monitoring engine 322, inference engine 324, analysis engine 326, anomaly engine 327, web services 329, or the like, may be arranged to employ geo-location information to select one or more localization features, such as, time zones, languages, currencies, calendar formatting, or the like. Localization features may be used when interpreting network traffic, monitoring application protocols, user-interfaces, reports, as well as internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, network topology database 314, protocol information 316, or the like. In some embodiments, network topology database 314 may be a data store that contains information related to the topology of one or more network monitored by a NMC. And, protocol information 316 may store various rules or configuration information related to one or more network communication protocols, including application protocols, secure communication protocols, client-server protocols, peer-to-peer protocols, shared file system protocols, protocol state machines, or the like, that may be employed for protocol analysis, entity auto-discovery, anomaly detections, or the like, in a monitored network environment.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include network monitoring engine 322, inference engine 324, analysis engine 326, anomaly engine 327, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, containers, modules, plugins, or the like.

Furthermore, in one or more of the various embodiments, network monitoring engine 322, inference engine 324, analysis engine 326, anomaly engine 327, web services 329, or the like, may be operative in a cloud-based computing environment. In one or more of the various embodiments, these applications, and others, that comprise a network monitoring computer may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to network monitoring engine 322, inference engine 324, analysis engine 326, anomaly engine 327, web services 329, or the like, may be provisioned and de-commissioned automatically.

Also, in one or more of the various embodiments, network monitoring engine 322, inference engine 324, analysis engine 326, anomaly engine 327, web services 329, or the like, may be located in virtual servers running in a cloud-based computing environment rather than being tied to one or more specific physical network computers. Likewise, in some embodiments, one or more of network monitoring engine 322, inference engine 324, analysis engine 326, anomaly engine 327, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
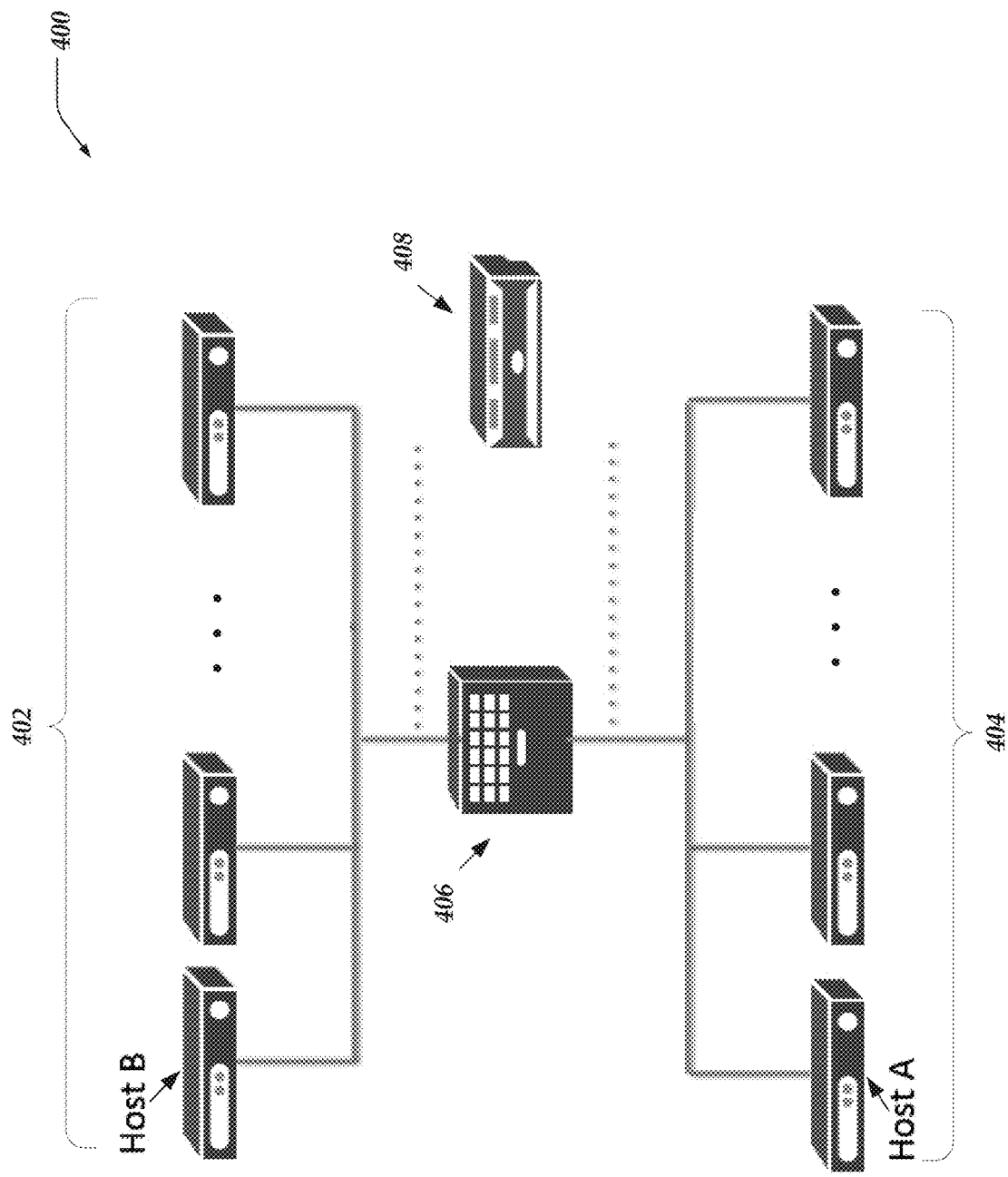
FIG. 4 illustrates a logical architecture of a system for detecting injection attacks using passive network monitoring in accordance with one or more of the various embodiments.

FIG. 4 illustrates a logical architecture of system 400 for detecting injection attacks using passive network monitoring in accordance with one or more of the various embodiments. System 400 may be arranged to include a plurality of network devices or network computers on first network 402 and a plurality of network devices or network computers on second network 404. In this example. communication between the first network and the second network is managed by switch 406. Also, NMC 408 may be arranged to passively monitor or record packets (network packets) that are communicated in network flows between network devices or network computers on first network 402 and second network 404. For example, the communication of flows of packets between the Host B network computer and the Host A network computer are managed by switch 406 and NMC 408 may be passively monitoring and recording some or all of the network traffic comprising these flows.

NMC 408 may be arranged to receive network communication for monitoring through a variety of means including network taps, wireless receivers, port mirrors or directed tunnels from network switches, clients or servers including the endpoints themselves, virtual machine, cloud computing instances, other network infrastructure devices, or the like, or combination thereof. In at least some of the various embodiments, the NMC may receive a copy of each packet on a particular network segment or virtual local area network (VLAN). Also, for at least some of the various embodiments, NMCs may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. For example, in some embodiments, NMCs may be arranged to receive electronic signals over or via a physical hardware sensor that passively receives taps into the electronic signals that travel over the physical wires of one or more networks.

In one or more of the various embodiments, NMCs, such as, NMC 408, or the like, may be arranged to detect injection attacks using passive network monitoring in part by correlating network activity, such as, requests, actions, or responses that may be associated with injection attacks that may manifest themselves across different portions of a multi-tier service that may employ multiple servers to support the overall application or service.

In one or more of the various embodiments, NMCs may be arranged to monitor incoming client requests that may be provided to a frontend server, such as, a webserver or other accessible endpoint. Also, in some embodiments, the NMCs may be arranged to monitor the network traffic sent to one or more other monitored servers from the frontend server in response to incoming client requests. And, in one or more of the various embodiments, the NMCs may be arranged to monitor one or more actions associated with one or more monitored servers to determine if they may be related to the client request or other requests sent by the frontend server or other monitored servers.

For brevity and clarity, network traffic sent by clients to frontend servers may be referred herein as client requests. Network traffic sent from frontend servers to internal servers (e.g., application servers, middleware servers, or the like) may be referred herein as dependent requests because such requests may be sent by the frontend server in response to client requests. Similarly, network activity or actions associated with a dependent request may be referred to as dependent actions because they may be associated with one or more dependent requests. Likewise, in one or more of the various embodiments, network traffic sent from the frontend server to the client computer that provided the client request may be referred to as frontend responses. See, FIG. 6 for a more detailed explanation of the relationship between client requests, frontend responses, dependent requests, dependent actions, dependent responses, or the like.

In one or more of the various embodiments, while the untrusted code for an injection attack may be initially delivered via a client request sent to a frontend server, the untrusted code may be propagated to one or more other servers where it may be executed. Accordingly, in one or more of the various embodiments, NMCs may be arranged to correlate monitored network traffic to identify dependent requests, dependent actions, or dependent responses that may be associated with client requests (e.g., suspicious requests) that may have introduced the untrusted code. Thus, in some embodiments, NMCs may be arranged to evaluate whether an injection attack may be occurring based on two or more correlated requests, actions, or responses. In some embodiments, NMCs may be arranged to employ the correlated network traffic to improve threat detection or evaluation and reduce false positives, as described in more detail below.

Figure 5:
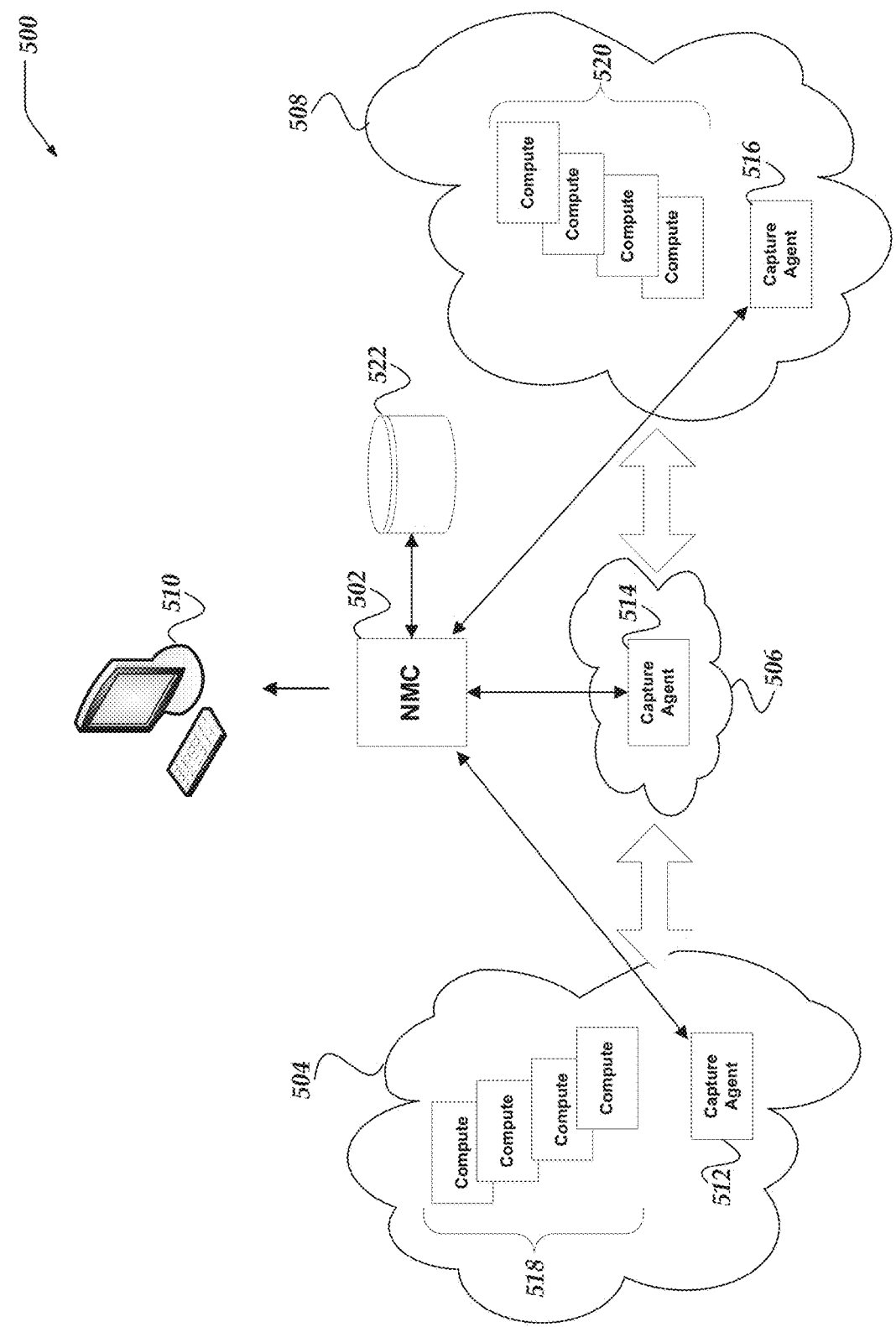
FIG. 5 illustrates a logical schematic of a system for detecting injection attacks using passive network monitoring in accordance with one or more of the various embodiments.

FIG. 5 illustrates a logical schematic of system 500 for detecting injection attacks using passive network monitoring in accordance with one or more of the various embodiments. In one or more of the various embodiments, an NMC, such as NMC 502 may be arranged to monitor network traffic in one or more networks, such as, network 504, network 506, or network 508. In this example, network 504, network 506, or network 508 may be considered similar to network 108 or network 110. Also, in some embodiments, one or more of network 504, network 506, or network 508 may be considered cloud computing environments. Likewise, in some embodiments, one or more of network 504, network 506, or network 508 may be considered remote data centers, local data centers, or the like, or combination thereof.

In one or more of the various embodiments, NMCs, such as NMC 502 may be arranged to communicate with one or more capture agents, such as, capture agent 512, capture agent 514, or capture agent 514. In some embodiments, capture agents may be arranged to selectively capture network traffic or collect network traffic metrics that may be provided to NMC 502 for additional analysis.

In one or more of the various embodiments, capture agents may be NMCs that are distributed in various networks or cloud environments. For example, in some embodiments, a simplified system may include one or more NMCs that also provide capture agent services. In some embodiments, capture agents may be NMCs arranged to instantiate one or more capture engines to perform one or more capture or collection actions. Similarly, in one or more of the various embodiments, one or more capture agents may be instantiated or hosted separately from one or more NMCs.

In one or more of the various embodiments, capture agents may be selectively installed such that they may capture metrics for selected portions of the monitored networks. Also, in some embodiments, in networks that have groups or clusters of the same or similar entities, capture agents may be selectively installed on one or more entities that may be representative of entire groups or clusters pf similar entities. Thus, in some embodiments, capture agents on the representative entities may collect metrics or traffic that may be used to infer the metrics or activity associated with similarly situated entities that do not include a capture agent.

Likewise, in one or more of the various embodiments, one or more capture agents may be installed or activated for a limited time period to collect information that may be used to infer activity information about the monitored networks. Accordingly, in one or more of the various embodiments, these one or more capture agents may be removed or de-activated if sufficient activity information or network traffic has been collected.

In one or more of the various embodiments, system 500 may include one or more network entities, such as, entities 518, entities 520, or the like, that communicate in or over one or more of the monitored networks. Entities 518 and entities 520 are illustrated here as cloud environment compute instances (e.g., virtual machines), or the like. However, one of ordinary skill in the art will appreciate that entities may be considered to be various network computers, network appliances, routers, switches, applications, services, containers, or the like, subject to network monitoring by one or more NMCs. See also, FIG. 4.

In this example, for one or more of the various embodiments, capture agents, such as capture agent 512 may be arranged to capture network traffic or network traffic metrics associated with one or more entities, such as, entities 518. Accordingly, in some embodiments, some or all of the information captured by capture agents may be provided to one or more NMCs, such as, NMC 502 for additional analysis. Also, in one or more of the various embodiments, capture agents or NMCs may be arranged to selectively store network traffic in a captured data store, such as, captured data store 522.

Figure 6:
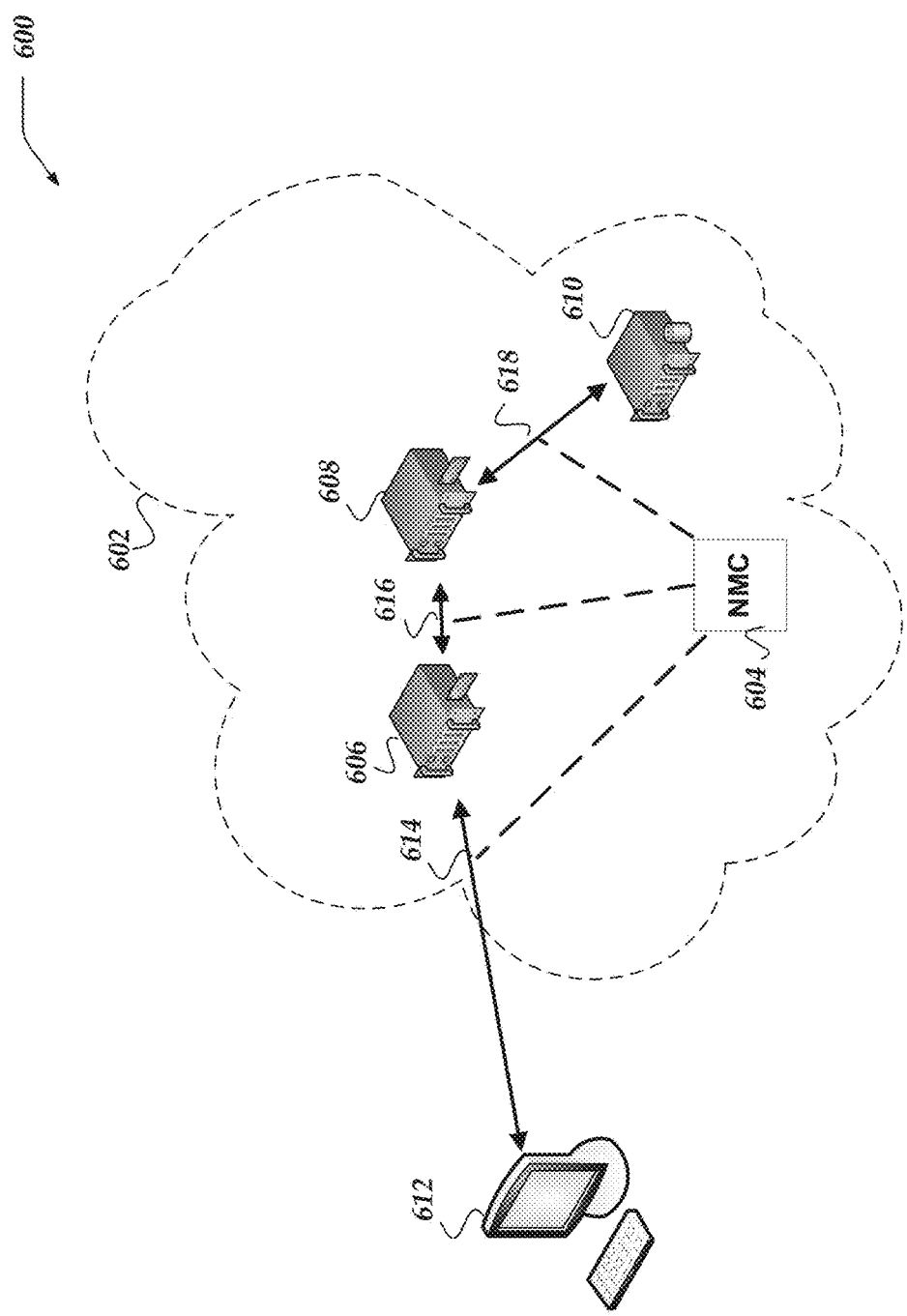
FIG. 6 illustrates the logical architecture of a portion of a system for detecting injection attacks using passive network monitoring in accordance with one or more of the various embodiments.

FIG. 6 illustrates the logical architecture of a portion of system 600 for detecting injection attacks using passive network monitoring in accordance with one or more of the various embodiments. For brevity and clarity, system 600 shows a simplified view of a monitored network and servers is in accordance with one or more of the various embodiments. Accordingly, for some embodiments, a system, such as, system 600 may include: one or more networks, such as, network 602; one or more NMCs, such as, NMC 604; two or more servers, such as, frontend server 606, application server 608, database server 610, or the like; one or more client computers, such as, client computer 612; two or more observation ports, such as, observation port 614, observation port 616, observation port 618, or the like.

Accordingly, in this example, NMC 604 may be arranged to employ observation port 614 to monitor client requests provided to frontend server 606 by client computer 612. Also, in this example, NMC 604 may be arranged to employ observation port 616 to monitor network traffic exchanged between frontend server 606 and application server 608. And, in this example, NMC 604 may be arranged to employ observation port 618 to monitor network traffic exchanged between application server 608 and database server 610. Note, in some embodiments, observation ports 614, 616, or 618 may be the same observation port. For example, in some embodiments, if frontend server 606, application server 608, or database server 610, or the like, are on the same network or sub-network, NMC 604 may be arranged to monitor the network traffic exchanged between them by employing one observation port rather than employing three observation ports as shown here. In this example, the NMC 604 is arranged to simultaneously monitor network traffic that may be exchanged between the various servers in network 602 as well as the network traffic exchanged between frontend server 614 and client computer 612, or the like.

In this example, for some embodiments, client computer 612 may send a client request to frontend server 606, which may cause frontend server 606 to send one or more dependent requests to application server 608, which may in turn cause application server 608 to send one or more dependent requests to database server 610. Likewise, for example, database server 610 may perform one or more dependent actions based on one or more dependent requests that may include sending one or more dependent responses to application server 608 which in turn may trigger one or more dependent actions, such as sending one or more dependent responses to frontend server 606, which may in turn send one or more frontend responses to client computer 612.

Accordingly, in some embodiments, NMC 604 may be arranged to monitor and track the various dependent requests or dependent actions that may be associated with a given client request. In some embodiments, the format, application protocols, communication protocols, or the like, associated with some or all of the different requests or actions may be different depending on which client or server provides the requests or performs the actions. Accordingly, in some embodiments, NMCs may be arranged to monitor the network traffic exchanged between the servers or clients to determine correlations that may be used to identify one or more dependent requests or one or more dependent actions that may be associated with a client request.

In one or more of the various embodiments, as client requests are monitored, NMC 604 may be arranged to perform an initial evaluation or validation of incoming client requests to determine if the NMC should monitor other network traffic in the monitored network for dependent requests or dependent actions that may be associated with the incoming client request.

In one or more of the various embodiments, NMCs, such as, NMC 604, or the like, may be arranged to determine or select one or more portions of the client requests to evaluate them for susceptibility to injection attacks. In one or more of the various embodiments, NMCs may employ various initial criteria to determine if a client request should be validated for susceptibility to injection attacks. In some embodiments, criteria may include (or be based on) one or more characteristics of the requests, the client, the target of the request, tuple information (e.g., source network address information, destination network address, or the like), time of day, system or network utilization, rate of requests sent or received, or the like, or combination thereof. In some embodiments, an NMC may be arranged to employ a tiered or hierarchical validation (or filtering) process such that it may perform some preliminary validation on incoming requests before determining if they should be further validated for injection attack risk. In some embodiments, NMCs may be arranged to determine some or all of the criteria for determining whether to validate client requests based on rules or conditions that may be obtained from configuration information.

In one or more of the various embodiments, NMCs may be arranged to provide and store correlation information that may be associated with one or more the client requests. In some embodiments, correlation information may be collected for requests that may be determined to be associated with an elevated risk of injection attack. In some embodiments, correlation information may include one or more portions of the client requests, including, communication protocol information (e.g., one or more TCP field values, or the like), parameter or parameter values, URLs, query strings, HTTP information (e.g., cookies, header field values, user-agent strings, and so on), some or all of the tuple information, or the like. In some embodiments, the some or all the payload or some or all of the network packet(s) associated with a client request may be stored as correlation information. In some embodiments, NMCs may be arranged to associate different kinds of client requests with different correlation information such that different information, characteristics, or values may be associated with different client requests. In some embodiments, NMCs may be arranged to determine some or all of the correlation information based on configuration information.

In one or more of the various embodiments, in response to receiving a client request, a frontend server, such as, frontend server 606 may generate one or more dependent requests that may be directed to one or more other servers, such as, application server 608. For example, in some embodiments, the client request may be a HTTP request associated with a particular user or asset that may be managed or stored by another server.

For example, a process on frontend server 606 may parse the incoming request and determine that the client is requesting information that may be available on a different server. The client request may indicate that a user wants to view an invoice or other record that may be managed by application server 608. Accordingly, in this example, the frontend server may generate an appropriate dependent request and send it to an application server, such as, application server 608.

In one or more of the various embodiments, NMCs, such as, NMC 604 may be arranged to monitor network traffic sent by frontend servers to identify one or more requests that may be dependent on client requests. In some embodiments, requests provided by a frontend server may be subject to the filtering or validation to determine if they should be evaluated or otherwise considered dependent on a client request.

In some embodiments, NMCs may be arranged to employ some or all of the correlation information to identify one or more dependent requests. In some embodiments, this may include comparing the network traffic that may be associated with a request sent by another server with correlation information that is associated with one or more client requests. For example, in some embodiments, correlation information may be based on one or more values or features of the client request that would be likely to be included in dependent requests, such as, identifiers, keys, tuple information, application specific data, or the like.

Also, in some embodiments, NMCs may be arranged to update or modify the correlation information associated with the original client request based on information determined from the one or more dependent requests. In some embodiments, NMCs may be arranged to determine dependent requests based on pattern matching, templates, rules, conditions, or the like, that may be obtained from configuration information.

Further, in one or more of the various embodiments, application servers, such as, application server 608 may require information from one or more other servers to respond to one or more received dependent requests. For example, in some embodiments, application server 608 may need to retrieve information from database server 610 to respond to a dependent request received from frontend server 606.

In this example, for some embodiments, application server 608, or the like, may send one or more requests that may be dependent on one or more dependent requests sent by frontend server 606. Accordingly, in one or more of the various embodiments, an NMC may be arranged to perform one or more actions to filter or validate some or all of network traffic sent by application servers (or other intervening servers) to determine if the application server may be sending its own dependent requests to another server, such as, database server 610. Also, in some embodiments, NMCs may be arranged to update the correlation information associated with the initiating client request with information based on the dependent requests sent by an application server.

In some embodiments, in response to receiving a dependent request from application server 608, other servers, such as, database server 610 may be arranged to perform one or more actions that may be associated with the dependent request. In some embodiments, such actions may include sending responses to application server 608, or, in some cases, to other servers.

Accordingly, in one or more of the various embodiments, NMCs may be arranged to monitor network traffic that may be sent from other servers, such as, database server 610 to determine if one or more responses may be associated with one or more dependent requests. In some embodiments, NMCs may employ correlation information to determine if one or more responses may be dependent responses. This process may be considered similar to how dependent requests may be determined. However, in some embodiments, the correlation information used to make such determinations may vary from the correlation information used to identify dependent requests.

Similarly, in one or more of the various embodiments, NMCs may be arranged to monitor network traffic that may originate from other servers, including, application server 608, frontend server 606, or the like, to determine if there may be dependent actions, such as, dependent responses, or the like, that may be associated with an initial client request.

Also, in one or more of the various embodiments, NMCs may be arranged to evaluate or validate each identified dependent request or dependent action to determine a risk or likelihood of an association with an injection attack. Accordingly, in one or more of the various embodiments, the risk of an injection attack may be evaluated in view of some or all of the related dependent requests, some or all of the related dependent actions, some or all of the correlation information, or the like.

In some cases, injection attacks may pass through one or more servers before they are detected. Thus, in some embodiments, NMCs may be arranged to employ the stored correlation information to determine the one or more servers that may be associated with a chain of dependent requests that may be associated with a detected injection attack. For example, in some embodiments, if an injection attack is detected or confirmed by validating dependent requests arriving at database server 610 or by dependent actions performed by database server 610, the NMC, in this example, may determine that the client request sent by client computer 612 may be the source of the attack.

In contrast, in conventional monitoring environments, dedicated monitors may be limited to monitoring requests sent to particular servers or services, such as, web servers, database servers, application servers, or the like. Accordingly, conventional monitors may be limited because of the context necessary for identifying the chain of dependent requests or dependent responses provides is unavailable to conventional monitors. For example, while a conventional monitor may identify injection attacks against a database server by monitoring requests sent to the database server, the conventional monitor is disabled from determining related upstream requests or downstream responses that may be related to the attack that was detected at the database server.

Further, in some embodiments, NMCs may employ the correlation information to improve the likelihood of attack detection or reduce the number of false positives. Employing the correlation information to evaluate potential threats may enable NMCs to evaluate characteristics of some or all of the chained requests, actions, or responses so it may use stricter criteria that would otherwise be unavailable to a conventional monitoring system.

Thus, in some embodiments, NMCs may have an improved chance to detect actual injection attacks while at the same time the number of false positive detections may be reduced. For example, some conventional monitors may reduce the number of false positive detections by narrowing or otherwise restricting the detection criteria. However, this may cause the same monitor to miss more attacks. Likewise, for example, broadening the detection criteria used by a conventional monitor may disadvantageously increase the number of false positive reports.

Figure 7:
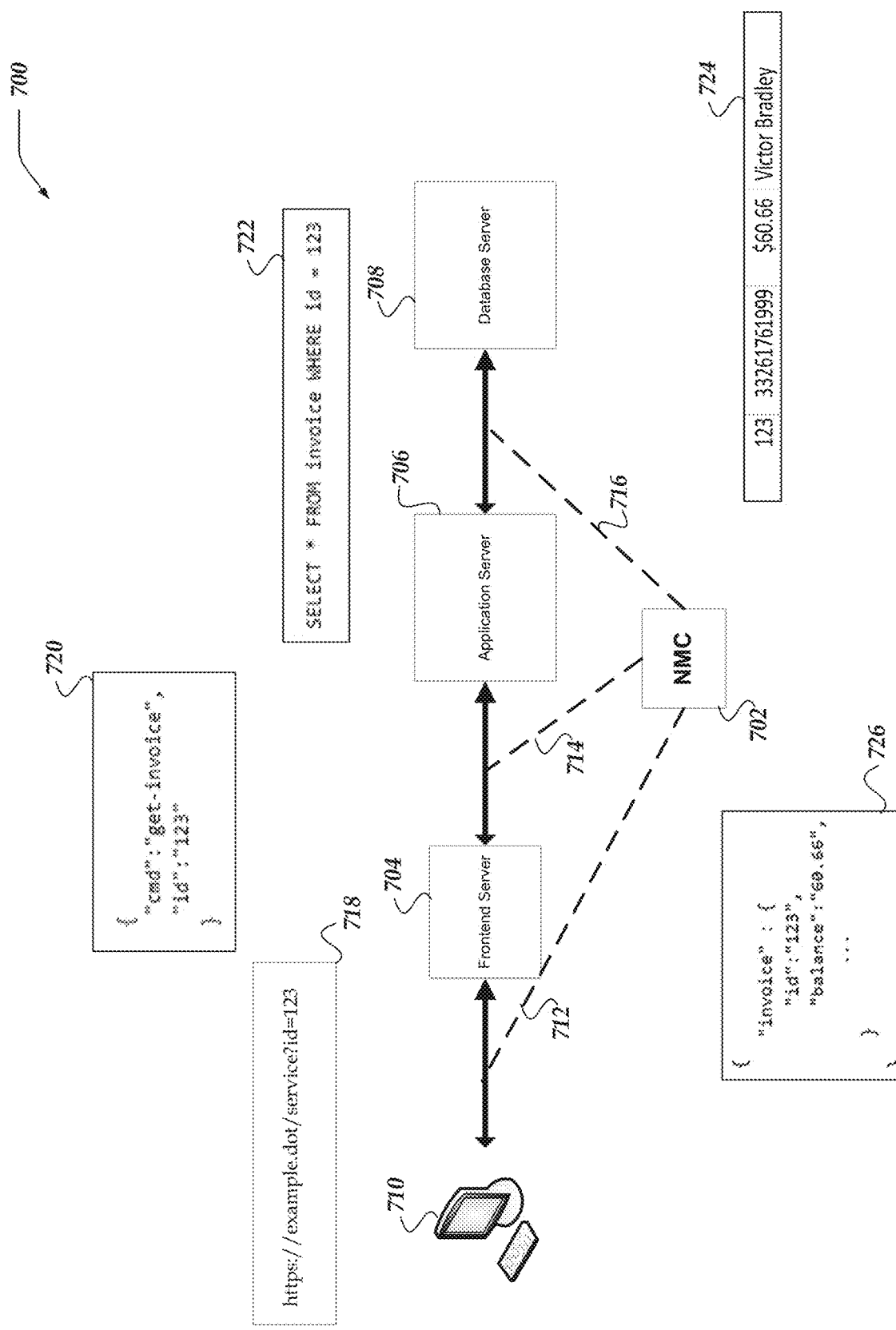
FIG. 7 illustrates a portion of a logical architecture of a system for detecting injection attacks using passive network monitoring in accordance with one or more of the various embodiments.

FIG. 7 illustrates a portion of a logical architecture of system 700 for detecting injection attacks using passive network monitoring in accordance with one or more of the various embodiments. In this example, system 700 includes NMC 702 which may be arranged to monitor network traffic in a network that includes two or more servers, such as, frontend server 704, application server 706, and database server 708. In this example, client computer 710 may be communicating over a network with frontend server 704. Also, in this example, NMC 702 may employ observation port 712, observation port 714, or observation port 716 to monitor network traffic that may be exchanged by the servers and client computer. Note, in this example, the observation ports are illustrated as being separate sources or channels. However, in some embodiments, one or more observation ports may be configured to monitor some or all of the network traffic in the monitored networking environment. For example, in some embodiments, NMC 702 may be arranged to monitor all of the servers and the client computer using one observation port if all of the traffic is visible on the same network or sub-network. Though, as shown here, most embodiments may be configured to have at least one separate network requiring multiple observation ports to capture or monitor the network traffic in the monitored networking environment.

In this example, for some embodiments, client computer 710 may send client request 718 to frontend server 704. In this example, in response to receiving client request 718, frontend server 704 may provide dependent request 720 to application server 706. And, in this example, in response to receiving dependent request 720, application server 706 may provide dependent request 722 to database server 708. Accordingly, in this example, database server 708 may provide a dependent response, such as, dependent response 724 to application server 706, which in turn may provide dependent response 726 to client computer 710.

In one or more of the various embodiments, as shown in this example, NMCs, such as, NMC 702 may be arranged to validate or evaluate one or more requests or responses in the monitored networking environment to determine correlation information that may be employed to identify one or more dependent requests (e.g., dependent request 720, dependent request 722, or the like) or one or more dependent responses (e.g., dependent response 726, dependent response 724, or the like) that may be associated with client requests, such as, client request 718.

Figure 8:
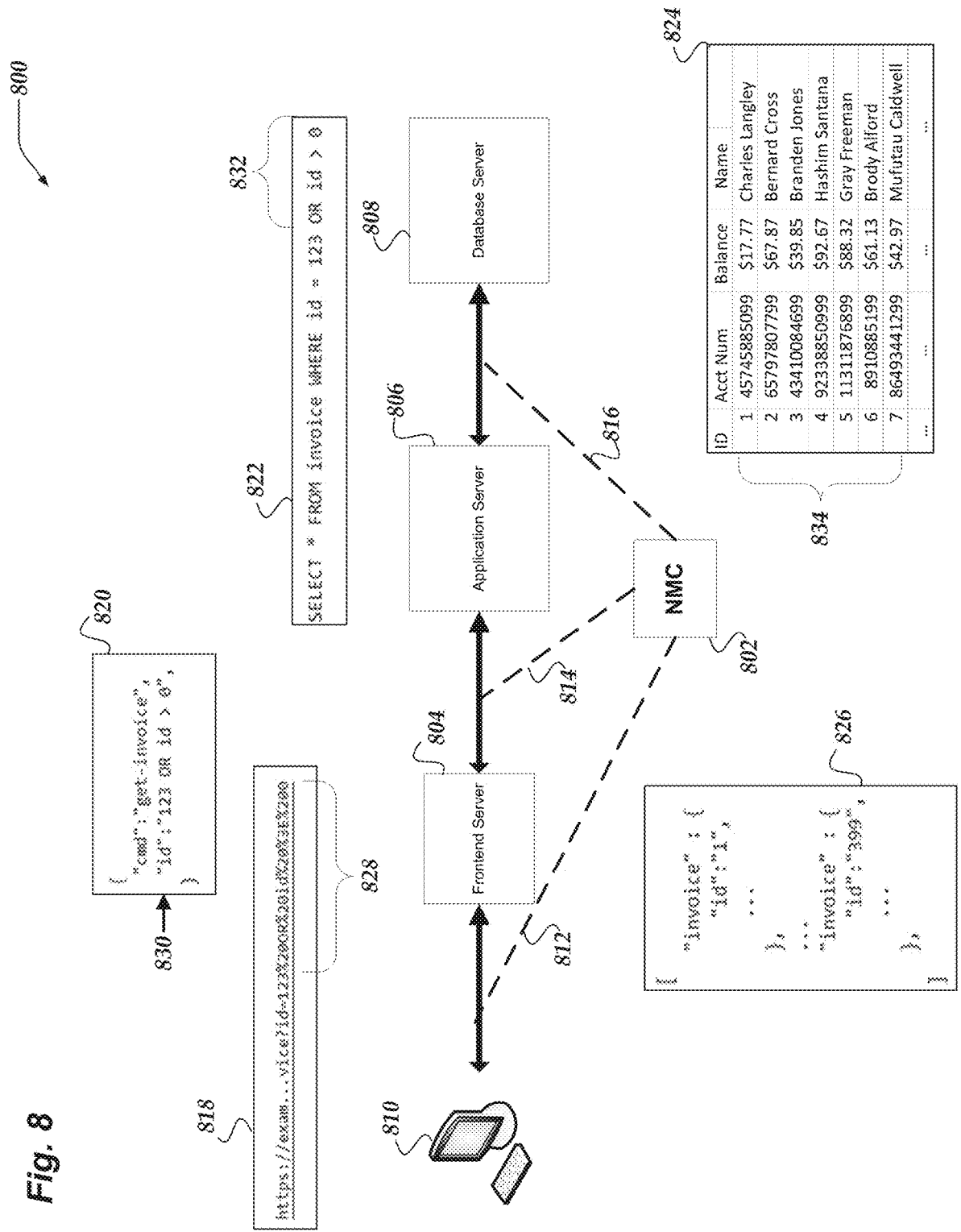
FIG. 8 illustrates a portion of a logical architecture of a system for detecting injection attacks using passive network monitoring in accordance with one or more of the various embodiments.

FIG. 8 illustrates a portion of a logical architecture of system 800 for detecting injection attacks using passive network monitoring in accordance with one or more of the various embodiments. In this example, system 800 includes NMC 802 which may be arranged to monitor network traffic in a network that includes two or more servers, such as, frontend server 804, application server 806, and database server 808. In this example, system 800 is similar to system 700 described above, however, system 800 as may be considered to be subject to an injection attack.

In this example, client computer 810 may be communicating with frontend server 804. Also, in this example, NMC 802 may employ observation port 812, observation port 814, or observation port 816 to monitor network traffic that may be exchanged by the servers and client computers. Note, in this example, the observation ports are illustrated as being separate sources or channels. However, in some embodiments, one (or more) observation ports may be configured to monitor some or all of the network traffic in the monitored networking environment.

In this example, for some embodiments, client computer 810 may send client request 818 to frontend server 804. In this example, client request 818 is similar to client request 718 in FIG. 7, except that includes an injection attack. Accordingly, in this example, client request 818 includes untrusted, malicious or malformed code represented by request portion 828. In this example, some untrusted data has been encoded and appended to an otherwise legitimate appearing client request.

In this example, in response to receiving client request 818, frontend server 804 may provide dependent request 820 to application server 806. In this example, the injected untrusted code (e.g., from request portion 828) is being carried deeper into system 800. In this this example, dependent request 820 differs from dependent request 718 in FIG. 7 at least because it includes request portion 830. In this example, request portion 830 illustrates how the untrusted code from client request 818 may be decoded and included in a dependent request, such as, dependent request 820.

And, in this example, in response to receiving dependent request 820, application server 806 may provide dependent request 822 to database server 808. In this example, dependent request 822 differs from the otherwise similar dependent request 722 in FIG. 7 at least because it includes request portion 832. In this example, request portion 832 illustrates how the untrusted code from dependent request 820 may be transformed and included in a dependent request, such as, dependent request 822. Here, in this example, the injection attack has resulted in a dependent request that includes SQL code that is constructed to return all invoices in an invoice table, rather than just the invoice for a user that with an id of 123.

Accordingly, in this example, database server may provide a dependent response, such as, dependent response 824 that includes all of the invoice records to application server 806, which in turn may provide dependent response 826 to client computer 810.

In this example, in some cases, at each stage of the injection attack, it is possible that one or more conventional monitors may raise one or more alarms associated with untrusted code that is introduced by client request 818. Thus, in some cases, for example, if each dependent request or dependent response associated with the injection attack is detected, conventional monitors may disadvantageously raise as many as five independent alarms for the injection attack. Alternatively, in some cases, conventional monitoring may fail to detect some of the compromised dependent requests or some of the compromised dependent responses making it difficult or impossible for system administrators or incident response teams to determine the extent of the penetration so they can perform effective remediation.

In contrast, in this example, for some embodiments, NMCs may be arranged to determine the link between the different stages of the injection attack that is introduced by client request 818 even if each stage of the attack does not raise an alarm. For example, if NMC 802 finally confirms the injection attack because it detects the large amount of data (e.g., all the invoice records) unexpectedly being provided to client computer 810, NMC 802 may be arranged to employ correlation information collected from one or more stages of the injection attack to provide notification information that enables system administrators or incident response teams to see the full extent of the injection attack. Accordingly, they may be enabled to take the proper remediation steps to resolve or otherwise recover from the attack.

Generalized Operations

Figure 9:
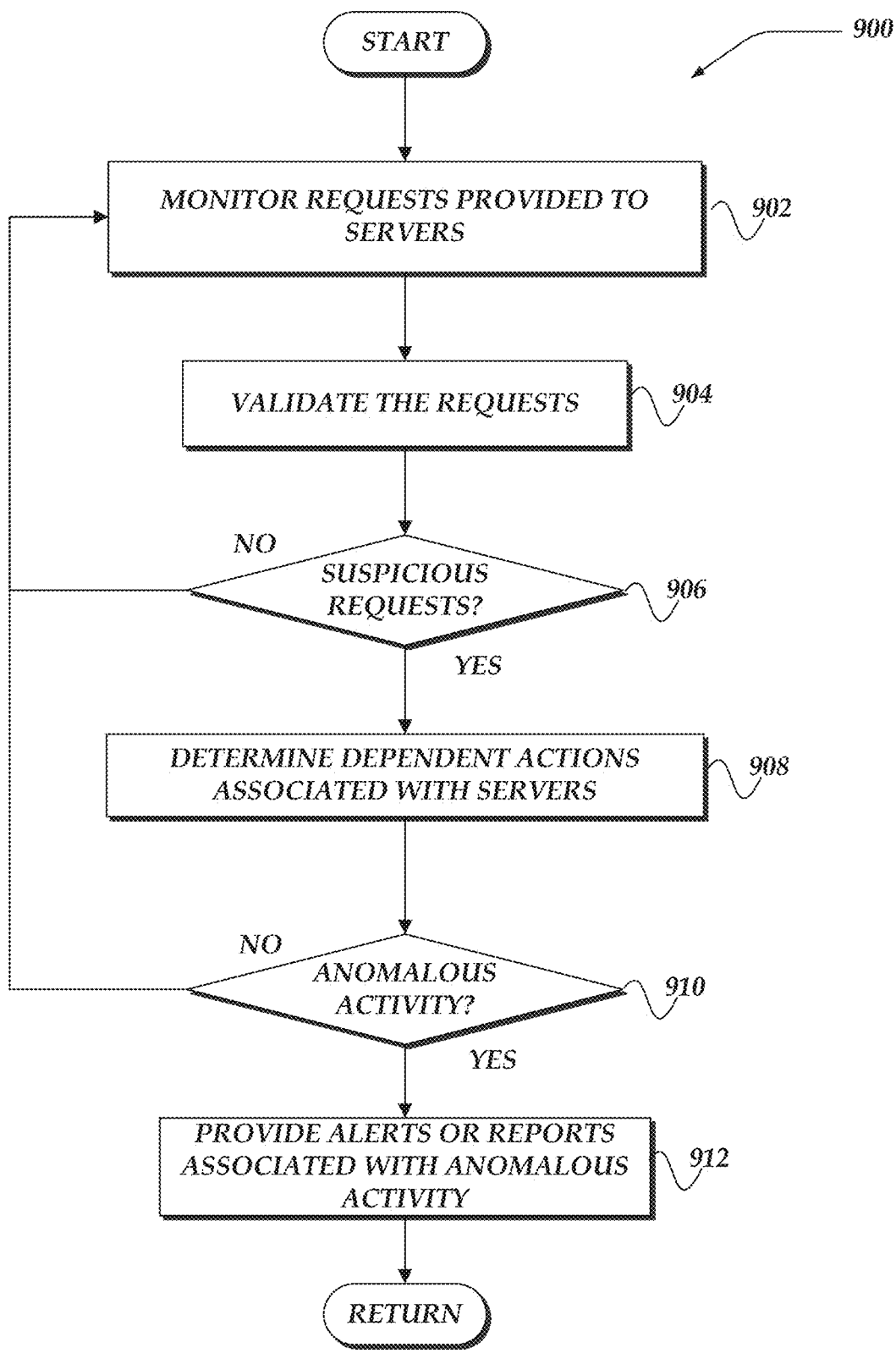
FIG. 9 illustrates an overview flowchart of a process for detecting injection attacks using passive network monitoring in accordance with one or more of the various embodiments.
Figure 10:
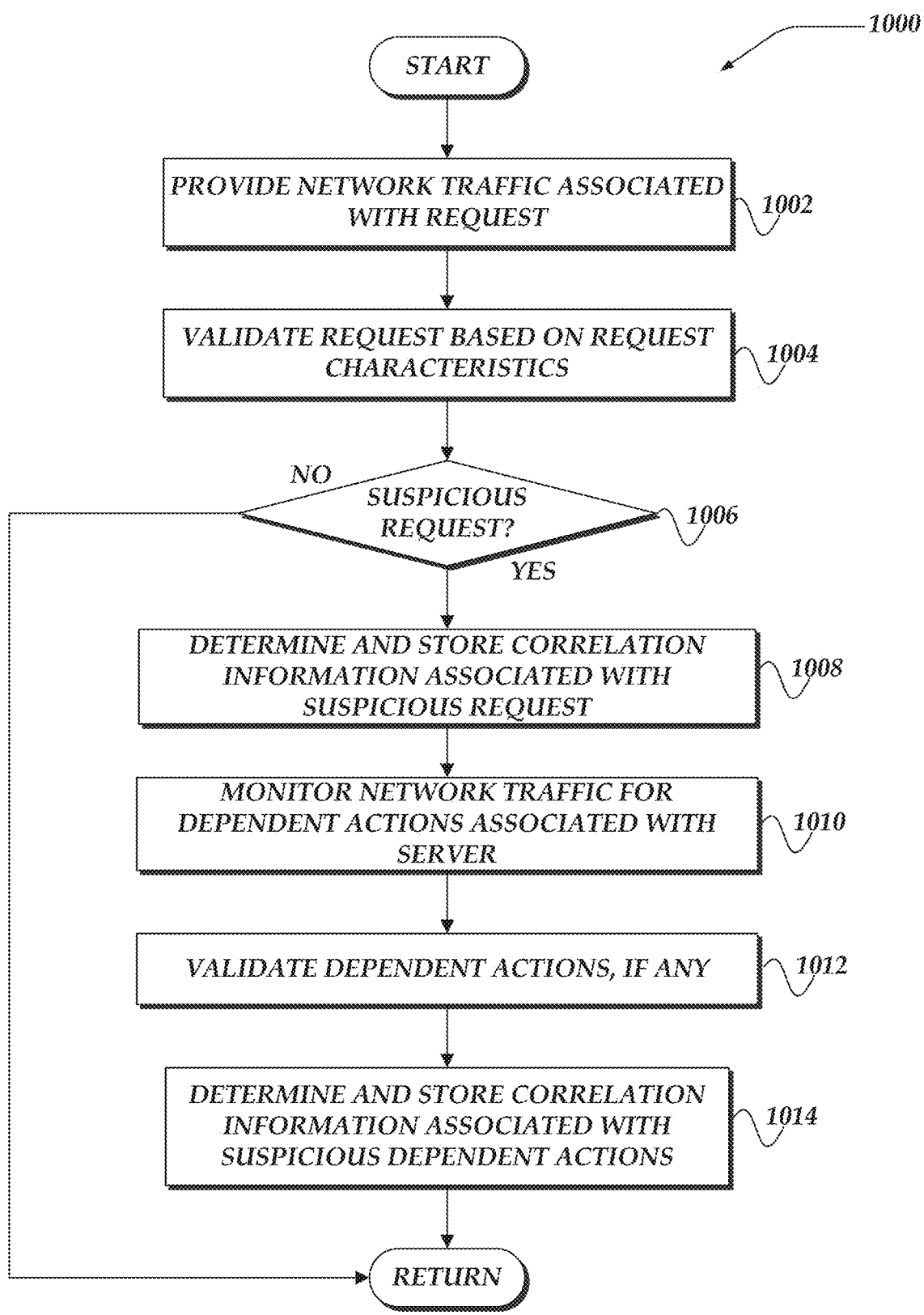
FIG. 10 illustrates a flowchart of a process for validating requests for detecting injection attacks using passive network monitoring in accordance with one or more of the various embodiments.
Figure 11:
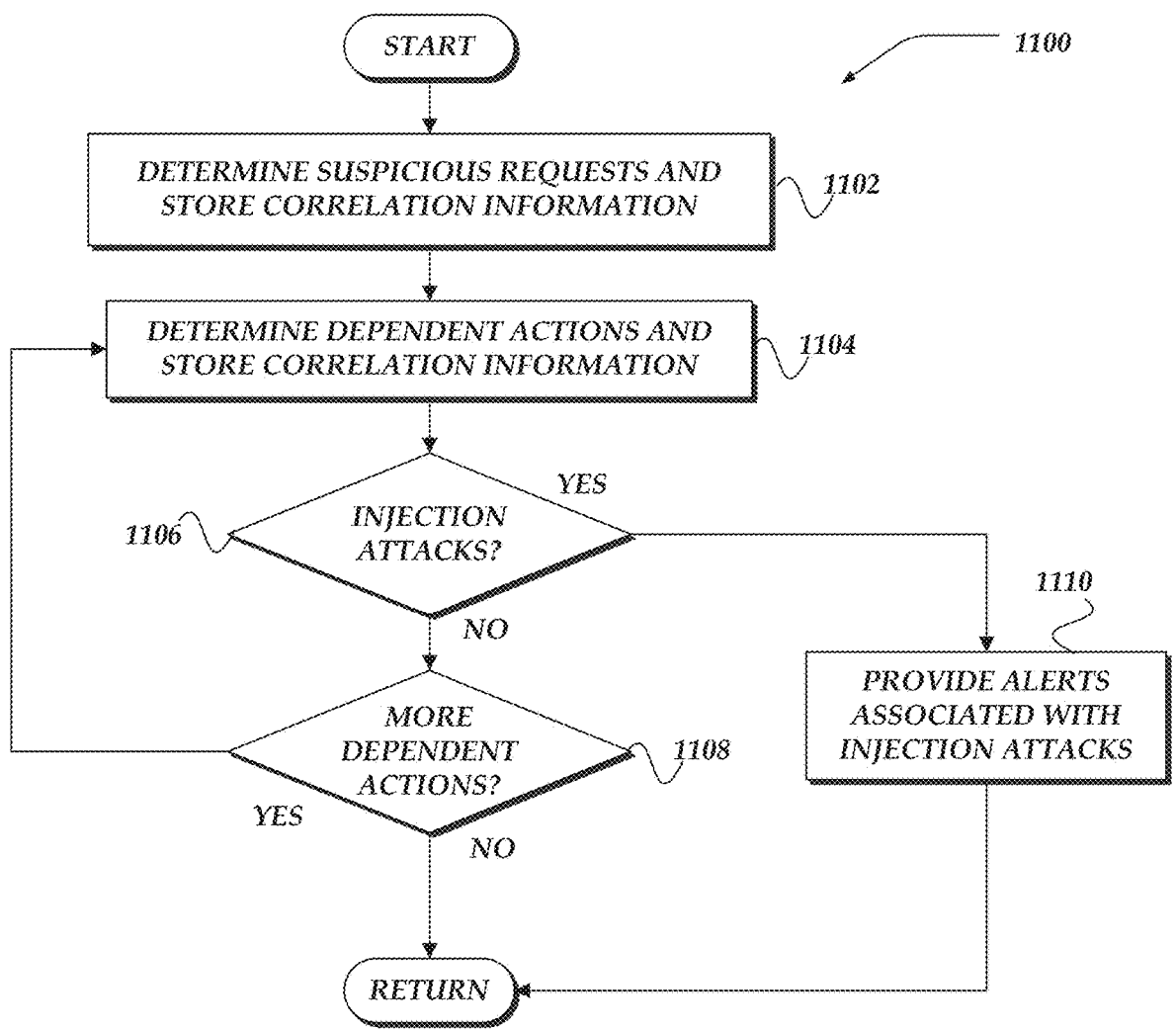
FIG. 11 illustrates a flowchart of a process for determining and validating actions for detecting injection attacks using passive network monitoring in accordance with one or more of the various embodiments.

FIGS. 9-11 represent generalized operations for detecting injection attacks using passive network monitoring in accordance with one or more of the various embodiments. In one or more of the various embodiments, processes 900, 1000, and 1100 described in conjunction with FIGS. 9-11 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-11 may be used for detecting injection attacks using passive network monitoring in accordance with at least one of the various embodiments or architectures such as those described in conjunction with FIGS. 4-8. Further, in one or more of the various embodiments, some or all of the actions performed by processes 900, 1000, and 1100 may be executed in whole or in part by network monitoring engine 322, inference engine 324, analysis engine 326, anomaly engine 327, or the like, running on one or more processors of one or more network computers.

FIG. 9 illustrates an overview flowchart of process 900 for detecting injection attacks using passive network monitoring in accordance with one or more of the various embodiments. After a start block, at block 902, in one or more of the various embodiments, one or more NMCs may be arranged to monitor network traffic for one or more requests that may be provided to one or more servers in a monitored networking environment. As described above, the one or more NMCs may be arranged to employ one or more observation ports to monitor or capture network traffic that may be directed to one or more servers in the monitored networking environment.

In one or more of the various embodiments, the one or more NMCs may be arranged to determine the one or more portions of the network traffic that may include requests. In some embodiments, NMCs may be arranged to employ one or more filters or rules that are configured to determine which portions of the network traffic that may include one or more requests. In some embodiments, this may include monitoring one or more well-known or defined network addresses, ports, or the like.

Further, in one or more of the various embodiments, NMCs may be arranged to distinguish requests from other network traffic based on the communication protocol or application protocol that may be employed by the request providers (e.g., client computers, other servers, or the like). For example, many requests directed to web servers may be provided via communication protocol TCP/IP using HTTP application protocol directed to TCP port 80, or the like. Generally, in some embodiments, configuration information available to the one or more NMCs may define filters, rules, patterns, templates, or the like, that may be employed to determine one or more requests from other network traffic.

At block 904, in one or more of the various embodiments, the one or more NMCs may be arranged to perform one or more actions to validate the one or more requests. In one or more of the various embodiments, as described above, NMCs may be arranged to collect correlation information that may be associated with incoming requests. However, in one or more of the various embodiments, given that most or many requests may be inherently safe with respect to injection attacks, it may be disadvantageous to collect correlation information for every request.

In one or more of the various embodiments, because collecting correlation information consumes memory resources of the NMCs, validation may be employed to help preserve memory resources. Likewise, in one or more of the various embodiments, the actions performed by NMCs to determine dependent requests or dependent responses also consumes compute resources of the NMCs. Accordingly, in one or more of the various embodiments, it may be advantageous to exclude requests that are known to be safe from additional the processing that may be required for detecting injection attacks.

Accordingly, in one or more of the various embodiments, NMCs may be arranged to perform one or more actions to determine if incoming client requests may be susceptible to being associated with injection attacks. For example, in some embodiments, vanilla HTTP GET requests that do not include query parameters, or the like, may be determined to be safe with respect to injection attacks. Accordingly, for this example, such requests may be disregarded with respect to injection attacks. Whereas, for example, in some embodiments, requests that are include varying or multiple query parameters may be considered risky enough to justify the expenditure of additional resources to guard against injection attacks.

In one or more of the various embodiments, NMCs may be arranged to employ a variety of methods to validate requests, including, templates, masks, pattern matching, machine learning classifiers or models, regular expressions, rules, computer readable instructions, parsers, grammars, abstract syntax trees, or the like, or combination thereof, that may be provided to the NMC via configuration information.

In some embodiments, NMCs may be arranged to select one or more validation actions based on additional information, such as, communication protocols, application protocols, applications, historical information (e.g., behavior observed previously), user preferences, or the like. Further, in some embodiments, NMCs may be arranged to select one or more validation actions based on one or more performance metrics that may be associated with the monitored networks. For example, if the network traffic is low or the rate of incoming requests is below a defined threshold value, NMCs may be arranged to employ validation methods that may be more aggressive (e.g., more likely to classify an incoming request as suspicious) because current metrics may indicate that few requests will arrive so expending the resources to evaluate a higher percentage of the incoming requests for additional monitoring may not be disadvantageous.

At decision block 906, in one or more of the various embodiments, if one or more of requests may be determined to be suspicious, control may flow to block 908; otherwise, control may loop back to block 902. In some embodiments, suspicious requests may be requests that range from requests that are likely to be compromised by injection attacks to requests that it may be possible to compromise. For example, in some embodiments, an NMC may compare a client request against an application specific template tests or confirms that a particular query string parameter is restricted to holding numerical values, thus if the value for that query string parameter appears to be non-numeric, the request may be identified as suspicious. Likewise, in some embodiments, for example, a client request that includes any query string parameters may be considered suspicious if the client request is associated with a critical application, or an application that is known to be more susceptible to injection attacks than other applications.

At block 908, in one or more of the various embodiments, the one or more NMCs may be arranged to determine one or more dependent actions, including one or more dependent requests that may be sent from one or more servers to one or more other servers. As describe above, in some embodiments, NMCs may monitor network traffic sent by one or more servers in the monitored networking environment. Accordingly, in one or more of the various embodiments, NMCs may be arranged to employ correlation information associated with one or more suspicious requests sent by client computers to determine if the servers are performing actions that may be correlated with the one or more suspicious requests (e.g., suspicious client requests).

In one or more of the various embodiments, correlation information may include one or more fields, values, tuple information, cryptographic values, or the like, that may match or otherwise may be associated with the suspicious requests.

At decision block 910, in one or more of the various embodiments, if anomalous activity is detected by the one or more NMCs, control may flow to block 914; otherwise, control may loop back to block 902. In one or more of the various embodiments, NMCs may be arranged to evaluate dependent actions, including dependent requests or dependent responses to determine if they may be anomalous or if they may be associated with anomalous activity. In some embodiments, NMCs may be arranged to evaluate if there may be anomalous activity based on various tests, conditions, heuristics, machine learning classifiers or models, or the like, that may be defined or designated in configuration information. Thus, in some embodiments, different organizations may be enabled to select configuration information that aligns with their risk tolerance, usage patterns, applications, or the like.

At block 914, in one or more of the various embodiments, the one or more NMCs may be arranged to provide one or more alerts, notifications, or reports that may be associated with the anomalous activity that was detected. In some embodiments, depending on the type of anomalous activity, NMCs may be arranged to perform various actions, such as, sending notifications, raising alarms, generating reports, or the like. Next, control may be returned to a calling process.

FIG. 10 illustrates a flowchart of process 1000 for validating requests for detecting injection attacks using passive network monitoring in accordance with one or more of the various embodiments. After a start block, at block 1002, in one or more of the various embodiments, one or more NMCs may be provided network traffic that may be associated with one or more requests. As described above, NMCs may be provided network traffic or they may capture network traffic from one or more observation ports. Further, in some embodiments, NMCs may be arranged to distinguish inbound network traffic that may include one or more requests from other network traffic. In some embodiments, this may include detecting handshake sequence exchanges for communication protocols or for application protocols. For example, in some embodiments, network traffic that includes HTTP protocol GET commands, or the like, may be considered requests. In other cases, for some embodiments, different applications or communication protocols may have one or more well-defined payloads or identifiable content that indicate that a remote computer is requesting data from a server. Accordingly, in one or more of the various embodiments, NMCs may be arranged to employs, rules, filters, or the like, as described above, provided by configuration information to determine if one or more portions of the monitored network traffic may include one or more requests. Requests associated with a client computer may be referred to as client requests to distinguish from other requests that may be discovered in the monitored network.

At block 1004, in one or more of the various embodiments, the one or more NMCs may be arranged to validate the one or more requests based on one or more characteristics of the one or more requests. In one or more of the various embodiments, NMCs may be arranged to perform one or more actions to validate or evaluate the incoming requests to determine if the requests may be susceptible or at risk for being associated with an injection attack.

At decision block 1006, in one or more of the various embodiments, if one or more requests may be determined to be suspicious, control may flow to block 1008; otherwise, control may be returned to a calling process. For brevity and clarity, requests that are determined to meet the criteria of being susceptible to being associated with an injection attack are referred herein as suspicious requests to distinguish them from requests that are not considered susceptible to being associated with an injection attack. Note, referring to a request as a suspicious request is not intended to imply that it is actually associated with an injection attack. Rather, it should be understood, that suspicious requests are requests that have one or more characteristics that trigger the NMC to collect correlation information that may be associated with the suspicious request or to attempt to determine one or more dependent requests or dependent responses that may be associated with the suspicious request.

At block 1008, in one or more of the various embodiments, the one or more NMCs may be arranged to determine and store correlation information that may be associated with the one or more suspicious requests. In one or more of the various embodiments, NMCs may be arranged to perform one or more actions to identify one or more characteristics of the suspicious request that may be used as correlation information. In some embodiments, correlation information may be information that NMCs may use to determine if other network traffic, such as, requests or responses, may be associated with a suspicious request. Thus, in one or more of the various embodiments, if correlation information is determined or collected, it may be stored in a data store for later use.

In one or more of the various embodiments, the format, or contents of the correlation information may vary depending on the characteristics of the suspicious request. In some embodiments, the entire request may be considered correlation information. Also, in some embodiments, the one or more portions of the suspicious request may be considered correlation information. Also, in some embodiments, metadata, such as, timestamps, or the like, may be included in the correlation information.

In one or more of the various embodiments, NMCs may be arranged to employ one or more rules, templates, masks, regular expressions, or the like, for generating correlation information based on a given suspicious request. In some embodiments, portions of the suspicious request may be extracted from the request payload extracted from the request and stored as correlation information.

At block 1010, in one or more of the various embodiments, the one or more NMCs may be arranged to monitor other network traffic that may be sent from the server associated with the one or more suspicious requests. As described above, NMCs may determine one or more actions performed by the server that received the client request, including one or more requests being sent by the server. In some embodiments, correlation information associated with one or more suspicious requests may be compared to one or more characteristics of the actions performed by other servers or requests being sent by other servers to identify dependent actions or dependent requests based on their correlation with suspicious requests.

At block 1012, in one or more of the various embodiments, the one or more NMCs may be arranged to validate the one or more dependent actions, including depending requests, if any. In some embodiments, NMCs may evaluate the one or more dependent requests to determine if they may be susceptible to an injection attack. Likewise, in some embodiments, NMCs may be arranged to evaluate the one or more dependent actions to determine if they may be associated with an injection attack. As described above, for client requests, NMCs may be arranged to determine if one or more of the dependent actions have characteristics that may make more susceptible to injection attacks based on one or more evaluations.

At block 1014, in one or more of the various embodiments, the one or more NMCs may be arranged to determine and store correlation information that may be associated with the dependent actions. In one or more of the various embodiments, similar to generating correlation information for suspicious requests, NMCs may be arranged to update the correlation information that may be associated with one or more suspicious requests with information that may be derived from the dependent actions. In some embodiments, this may include storing information about dependent requests that may be employed to associate the dependent actions to one or more suspicious requests. Also, in some embodiments, the additional correlation information may be employed to associate the dependent actions to the other servers that may be associated with one or more of the dependent actions.

Also, in some embodiments, the additional correlation information may include tuple information, application protocol information, communication protocol information, or the like, that may enable an NMC to identify the application that may be associated with the dependent actions or dependent requests. Accordingly, in one or more of the various embodiments, NMCs may be arranged to employ the correlation information to trace the associations between the one or more dependent actions (including dependent requests) and the suspicious requests even though they may span multiple servers, networks, sub-networks, or the like.

In one or more of the various embodiments, NMCs may be arranged to employ correlation information collected from other dependent actions (including dependent requests) or suspicious requests to identify dependent actions that may be associated with the same injection attack. Accordingly, in one or more of the various embodiments, as more dependent actions are discovered, the strength of the correlation between the various requests associated with the same injection attack may increase. Next, in one or more of the various embodiments, control may be returned to a calling process.

FIG. 11 illustrates a flowchart of process 1100 for determining and validating responses for detecting injection attacks using passive network monitoring in accordance with one or more of the various embodiments. After a start block, at block 1102, in one or more of the various embodiments, an NMC may be arranged to identify one or more suspicious requests (e.g., client requests) and store correlation information that may be associated with the suspicious request.

At block 1104, in one or more of the various embodiments, the NMC may be arranged to determine one or more dependent actions that may be associated with the suspicious requests. Accordingly, in one or more of the various embodiments, the NMC may be arranged to determine additional correlation information that may be associated with the dependent actions, if any, and store it in a data store.

At decision block 1106, in one or more of the various embodiments, if a pending injection attack may be detected, control may flow to block 1110; otherwise, control may flow to decision block 1108. In one or more of the various embodiments, for each determined dependent actions, the NMC may be arranged to evaluate the collection of correlation information that may be associated with the client request determined in block 1102. In some embodiments, as NMCs collect correlation information associated with a suspicious request, they may have an increased opportunity to detect that a malicious injection attack may be pending.

In one or more of the various embodiments, NMCs may be arranged to take one or more actions as soon as a pending injection attack is confirmed. Accordingly, in one or more of the various embodiments, NMCs may be arranged to direct process 1100 to flow to block 1110 to perform one or more actions in response to the confirmed the pending injection attack.

At decision block 1108, in one or more of the various embodiments, if there are more dependent requests, control may loop back to block 1104; otherwise, control may be returned to a calling process.

At block 1110, in one or more of the various embodiments, the NMC may be arranged to provide one or more alerts or notifications that may be associated with the pending injection attack.

Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for monitoring network traffic using one or more network computers, comprising:
   determining one or more requests as suspicious that are provided to a server in a monitored network based on one or more characteristics of the one or more provided requests, wherein correlation information is determined for the one or more suspicious requests;
   employing one or more characteristics of one or more dependent actions performed by the server to provide other correlation information for the one or more dependent actions, wherein the one or more dependent actions are evaluated for association with anomalous activity based on the correlation information and the other correlation information, wherein the anomalous activity comprises, an injection attack based on malformed information included in the one or more suspicious requests that is associated with one or more malformed shell instruction, malformed command instruction, or malformed inter-process communication associated with the one or more dependent actions;
   determining the other malformed information that is included in the one or more dependent actions based on an association with the malformed information that is included in the one or more suspicious request;

employing one or more characteristics of the one or more suspicious requests to provide one or more correlations associated with the one or more suspicious requests;

providing the evaluation of the one or more dependent actions for anomalous activity based on the one or more correlations associated with the one or more suspicious requests; and providing one or more reports that include information associated with the anomalous activity by the server and the one or more other servers in the monitored network.

2. The method of claim 1, wherein the one or more dependent actions further comprise:

one or more of dependent requests that are sent to one or more other servers in the monitored network and one or more other dependent actions performed by the one or more other servers in response to the one or more dependent requests.

3. The method of claim 1, further comprising:

determining the anomalous activity based on one or more of the malformed information or the other malformed information.

4. The method of claim 1, wherein determining the one or more requests further comprises:

providing configuration information for one or more of an application protocol or a communication protocol that is associated with the monitored network, wherein the configuration information includes one or more of a file, a database, user input, or a default value for the application protocol or the communication protocol; and validating that the one or more requests are provided by the server based on an evaluation of the configuration information by one or more of templates, masks, pattern matching, machine learning classifiers or models, regular expressions, rules, computer readable instructions, parsers, or grammars.

5. The method of claim 1, wherein the one or more characteristics of the one or more suspicious requests, includes: one or more of contents of the one or more suspicious requests, a sender of the one or more suspicious requests, a target of the one or more suspicious requests, tuple information, time of day, network utilization, or a rate of requests sent or received.

6. The method of claim 1, wherein the anomalous activity further comprises: an injection attack based on malformed information included in the one or more suspicious requests that is associated with malformed structured query language (SQL) instructions that are included in the one or more dependent actions.

7. A network monitoring computer (NMC) for monitoring communication over a network between one or more computers, comprising:

a memory that stores at least instructions; and one or more processors that execute instructions that are configured to cause performance of actions, including:

determining one or more requests as suspicious that are provided to a server in a monitored network based on one or more characteristics of the one or more provided requests, wherein correlation information is determined for the one or more suspicious requests;

employing one or more characteristics of one or more dependent actions performed by the server to provide other correlation information for the one or more dependent actions, wherein the one or more dependent actions are evaluated for association with anomalous activity based on the correlation information and the other correlation information, wherein the anomalous activity comprises, an injection attack based on malformed information included in the one or more suspicious requests that is associated with one or more malformed shell instruction, malformed command instruction, or malformed inter-process communication associated with the one or more dependent actions;

determining the other malformed information that is included in the one or more dependent actions based on an association with the malformed information that is included in the one or more suspicious request;

employing one or more characteristics of the one or more suspicious requests to provide one or more correlations associated with the one or more suspicious requests;

providing the evaluation of the one or more dependent actions for anomalous activity based on the one or more correlations associated with the one or more suspicious requests; and providing one or more reports that include information associated with the anomalous activity by the server and the one or more other servers in the monitored network.

8. The network monitoring computer of claim 7, wherein the one or more dependent actions further comprise:

one or more of dependent requests that are sent to one or more other servers in the monitored network and one or more other dependent actions performed by the one or more other servers in response to the one or more dependent requests.

9. The network monitoring computer of claim 7, further comprising:

determining the anomalous activity based on one or more of the malformed information or the other malformed information.

10. The network monitoring computer of claim 7, wherein determining the one or more requests further comprises:

providing configuration information for one or more of an application protocol or a communication protocol that is associated with the monitored network, wherein the configuration information includes one or more of a file, a database, user input, or a default value for the application protocol or the communication protocol; and validating that the one or more requests are provided by the server based on an evaluation of the configuration information by one or more of templates, masks, pattern matching, machine learning classifiers or models, regular expressions, rules, computer readable instructions, parsers, or grammars.

11. The network monitoring computer of claim 7, wherein the one or more characteristics of the one or more suspicious requests, includes: one or more of contents of the one or more suspicious requests, a sender of the one or more suspicious requests, a target of the one or more suspicious requests, tuple information, time of day, network utilization, or a rate of requests sent or received.

12. The network monitoring computer of claim 7, wherein the anomalous activity further comprises: an injection attack based on malformed information included in the one or more suspicious requests that is associated with malformed structured query language (SQL) instructions that are included in the one or more dependent actions.

13. A system for monitoring network traffic in a network: one or more network monitoring computers, comprising:
a memory that stores at least instructions; and
one or more processors that execute instructions that are configured to cause performance of actions, including:
determining one or more requests as suspicious that are provided to a server in a monitored network based on one or more characteristics of the one or more provided requests, wherein correlation information is determined for the one or more suspicious requests;
employing one or more characteristics of one or more dependent actions performed by the server to provide other correlation information for the one or more dependent actions, wherein the one or more dependent actions are evaluated for association with anomalous activity based on the correlation information and the other correlation information, wherein the anomalous activity comprises, an injection attack based on malformed information included in the one or more suspicious requests that is associated with one or more malformed shell instruction, malformed command instruction, or malformed inter-process communication associated with the one or more dependent actions;
determining the other malformed information that is included in the one or more dependent actions based on an association with the malformed information that is included in the one or more suspicious request;
employing one or more characteristics of the one or more suspicious requests to provide one or more correlations associated with the one or more suspicious requests;
providing the evaluation of the one or more dependent actions for anomalous activity based on the one or more correlations associated with the one or more suspicious requests; and
providing one or more reports that include information associated with the anomalous activity by the server and the one or more other servers in the monitored network.

14. The system of claim 13, wherein the one or more dependent actions further comprise:
one or more of dependent requests that are sent to one or more other servers in the monitored network and one or more other dependent actions performed by the one or more other servers in response to the one or more dependent requests.

15. The system of claim 13, further comprising:
determining the anomalous activity based on one or more of the malformed information or the other malformed information.

16. The system of claim 13, wherein determining the one or more requests further comprises:
providing configuration information for one or more of an application protocol or a communication protocol that is associated with the monitored network, wherein the configuration information includes one or more of a file, a database, user input, or a default value for the application protocol or the communication protocol; and
validating that the one or more requests are provided by the server based on an evaluation of the configuration information by one or more of templates, masks, pattern matching, machine learning classifiers or models, regular expressions, rules, computer readable instructions, parsers, or grammars.

17. The system of claim 13, wherein the one or more characteristics of the one or more suspicious requests, includes: one or more of contents of the one or more suspicious requests, a sender of the one or more suspicious requests, a target of the one or more suspicious requests, tuple information, time of day, network utilization, or a rate of requests sent or received; and
wherein the anomalous activity further comprises an injection attack based on malformed information included in the one or more suspicious requests that is associated with malformed structured query language (SQL) instructions that are included in the one or more dependent actions.

* * * * *